United States Patent
Lee et al.

(10) Patent No.: US 11,882,513 B2
(45) Date of Patent: Jan. 23, 2024

(54) TRANSPORTING MTNC-ID OVER SRV6-ENABLED DATAPLANE FOR 5G TRANSPORT

(71) Applicant: Huawei Technologies Co., Ltd., Shenzhen (CN)

(72) Inventors: Young Lee, Plano, TX (US); James Neil Guichard, Plano, TX (US); Kaippallimalil Mathew John, Plano, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/589,566

(22) Filed: Jan. 31, 2022

(65) Prior Publication Data

US 2022/0159545 A1 May 19, 2022

Related U.S. Application Data

(63) Continuation of application No. PCT/US2019/044416, filed on Jul. 31, 2019.

(51) Int. Cl.
*H04W 40/12* (2009.01)
*H04L 69/22* (2022.01)
(Continued)

(52) U.S. Cl.
CPC ............. *H04W 40/12* (2013.01); *H04L 69/22* (2013.01); *H04W 28/0205* (2013.01);
(Continued)

(58) Field of Classification Search
CPC ..... H04W 40/00; H04W 40/02; H04W 40/12; H04W 72/00; H04W 72/087;
(Continued)

(56) References Cited

U.S. PATENT DOCUMENTS 10,230,605 B1 * 3/2019 Filsfils ................... H04L 43/10
10,567,245 B1 2/2020 Patil et al.
(Continued)

FOREIGN PATENT DOCUMENTS

CN 103039027 A 4/2013
CN 107005556 A 8/2017
(Continued)

OTHER PUBLICATIONS

Herbert, et al., "Generic UDP Encapsulation," draft-ietf-intarea-gue-07, Mar. 7, 2019, 155 pages.
(Continued)

*Primary Examiner* — Warner Wong
(74) *Attorney, Agent, or Firm* — Conley Rose, P.C.

(57) ABSTRACT

A method for transporting a Multi-Transport Network Context Identifier (MTNC-ID) over a Segment Routing Version 6 (SRV6) enabled data plane for fifth generation (5G) transport. The method includes setting an indicator in a flags field of a SRV6 header of a data packet that an MTNC-ID type-length-value (TLV) is included in a TLV field of the SRV6 header. The MTNC-ID TLV for the MTNC-ID is inserted in the TLV field of the SRV6 header of the data packet. The data packet with the SRV6 header containing the MTNC-ID is transmitted over the SRV6 enabled data plane to a next node along a forwarding path corresponding to the MTNC-ID.

22 Claims, 14 Drawing Sheets

(51) Int. Cl.
*H04W 28/02* (2009.01)
*H04W 72/543* (2023.01)
*H04L 69/00* (2022.01)

(52) U.S. Cl.
CPC ..... *H04W 28/0236* (2013.01); *H04W 72/543* (2023.01); *H04L 69/26* (2013.01)

(58) Field of Classification Search
CPC ............ H04W 28/02; H04W 28/0231; H04W 28/0236; H04W 28/00; H04W 28/0205; H04W 28/0958; H04L 69/00; H04L 69/22; H04L 69/14; H04L 69/26; H04L 49/25; H04L 61/00; H04L 67/63; H04B 7/18584

See application file for complete search history.

(56) References Cited

U.S. PATENT DOCUMENTS

| | | | |
|---|---|---|---|
| 10,715,419 | B1 | 7/2020 | Suryanarayana et al. |
| 2006/0153111 | A1 | 7/2006 | Roh et al. |
| 2008/0240120 | A1 | 10/2008 | Kusama et al. |
| 2011/0271007 | A1 | 11/2011 | Wang et al. |
| 2013/0054761 | A1 | 2/2013 | Kempf et al. |
| 2013/0322451 | A1 | 12/2013 | Wang et al. |
| 2015/0256456 | A1 | 10/2015 | Previdi et al. |
| 2016/0050125 | A1 | 2/2016 | Mattson et al. |
| 2016/0142308 | A1* | 5/2016 | Gage .................. H04W 4/70 370/392 |
| 2016/0156691 | A1 | 6/2016 | Leeb et al. |
| 2016/0182400 | A1 | 6/2016 | Ceccarelli et al. |
| 2016/0212050 | A1 | 7/2016 | Yin et al. |
| 2016/0330114 | A1 | 11/2016 | Gafni et al. |
| 2017/0019331 | A1 | 1/2017 | Yong |
| 2017/0048739 | A1 | 2/2017 | Jeong et al. |
| 2017/0063783 | A1 | 3/2017 | Yong et al. |
| 2017/0187629 | A1 | 6/2017 | Shalev et al. |
| 2017/0366454 | A1* | 12/2017 | Liu .................. H04L 45/72 |
| 2018/0241671 | A1 | 8/2018 | Bosch et al. |
| 2018/0359176 | A1 | 12/2018 | Nainar et al. |
| 2018/0375968 | A1* | 12/2018 | Bashandy ........... H04L 12/4633 |
| 2019/0104111 | A1 | 4/2019 | Cidon et al. |
| 2019/0208040 | A1 | 7/2019 | Boucadair et al. |
| 2019/0215267 | A1* | 7/2019 | Filsfils .................. H04L 45/021 |
| 2019/0260657 | A1* | 8/2019 | Filsfils .................. H04L 41/5009 |
| 2020/0044973 | A1* | 2/2020 | Hei .................. H04L 45/34 |
| 2020/0099611 | A1* | 3/2020 | Filsfils .................. H04L 69/22 |
| 2020/0120022 | A1* | 4/2020 | Stammers ........... H04L 12/4633 |
| 2020/0145876 | A1 | 5/2020 | Dao et al. |
| 2020/0195556 | A1 | 6/2020 | Tang et al. |
| 2020/0229042 | A1* | 7/2020 | Srivastava ............ H04W 40/02 |
| 2020/0244573 | A1* | 7/2020 | Cui .................. H04W 4/50 |
| 2020/0280516 | A1* | 9/2020 | Gross, IV ............ H04L 69/324 |
| 2020/0314056 | A1* | 10/2020 | Desmouceaux .... H04L 61/2521 |
| 2020/0329008 | A1 | 10/2020 | Dao |
| 2020/0351766 | A1* | 11/2020 | Young .................. H04W 88/18 |
| 2020/0389397 | A1* | 12/2020 | Stammers ........... H04L 12/4625 |
| 2021/0083973 | A1* | 3/2021 | Peng .................. H04L 45/32 |
| 2021/0092052 | A1* | 3/2021 | Tantsura ............... H04L 45/34 |
| 2021/0099382 | A1 | 4/2021 | Liu et al. |
| 2023/0155926 | A1* | 5/2023 | Filsfils .................. H04L 45/302 370/392 |

FOREIGN PATENT DOCUMENTS

| | | | |
|---|---|---|---|
| CN | 107006045 | A | 8/2017 |
| CN | 108476208 | A | 8/2018 |
| CN | 108880904 | A | 11/2018 |
| CN | 109644186 | A | 4/2019 |
| CN | 109688057 | A | 4/2019 |
| CN | 109861924 | A | 6/2019 |
| EP | 3334105 | A1 | 6/2018 |
| KR | 20150123747 | A | 11/2015 |
| WO | 2016115850 | A1 | 7/2016 |
| WO | WO 2020/225092 | * | 4/2019 ............. H04L 12/46 |

OTHER PUBLICATIONS

"Internet Protocol Darpa Internet Program Protocol Specification," Sep. 1981, RFC 791, 51 pages.
3rd Generation Partnership Project; Technical Specification Group Core Network and Terminals; Study on User Plane Protocol in 5GC (Release 16), Technical Report, 3GPP TR 29.892, V1.0.0, Mar. 2019, 37 pages.
Bashandy, A., Ed., et al., "IS-IS Extensions to Support Segment Routing over IPv6 Dataplane," draft-bashandy-isis-srv6-extensions-00, Mar. 10, 2017, 16 pages.
Deering, et al., "Internet Protocol, Version 6 (IPv6) Specification," RFC 8200, 42 pages.
Lee, et al., Extended ACTN Architecture to Enable End-to-End 5G Transport Service Assurance, 2019 21st International Conference on Transparent Optical Networks (ICTON), IEEE Jul. 9, 2019 (Jul. 9, 2019), pp. 1-3, XP033618028, DOI: 10.1109/ICTON.2019,8840270, retrieved on Sep. 16, 2019.
Matsushima, S., et al., "Segment Routing IPv6 for Mobile User-Plane," draft-matsushima-spring-dmm-srv-mobile-uplane-03, Nov. 12, 2017, 20 pages.
Postel, "User Datagram Protocol," RFC 768, 3 pages.
Previdi, S. Ed., et al., "IPv6 Segment Routing Header (SRH)," draft-ietf-6man-segment-routing-header-06, Sep. 14, 2017, 35 pages.
"3rd Generation Partnership Project; Technical Specification Group Services and System Aspects; Procedures for the 5G System; Stage 2 (Release 16)," Technical Specification, 3GPP TS 23.502 v16.0.2 (Apr. 2019), 419 pages.
Filsfils, C., et al, "Segment Routing Policy Architecture," draft-filsfils-spring-segment-routing-policy-06.txt, SPRING Working Group Internet—Draft, May 21, 2018, 39 pages.
Li, R., et al., "Multi-constrained QoS Routing Algorithm in IPv6," Computer Engineering, vol. 31, No. 4, Feb. 2005, with the English Abstract, 3 pages.
Negi, M., et al., "PCEP Extensions for Segment Routing leveraging the IPv6 data plane," draft-ietf-pce-segment-routing-ipv6-00, PCE Working Group Internet—Draft, Mar. 10, 2019, 23 pages.
Cui, J., "Research on Quality of Service Based on DiffServ Over MPLS Architecture," Science and Technology Information, No. 13, 2008, School of Physical Science and Information Engineering, Liaocheng University, with the English Abstract, 3 pages.
Filsfils, C., et al, "SRv6 Network Programming," draft-ietf-spring-srv6-network-programming-00, SPRING Internet—Draft, Apr. 24, 2019, 48 pages.
Xu, W., "Research and Implementation of IPv6 Dataflow Reassembly," A Dissertation Submitted for the Degree of Master,South China University of Technology, 2010, with the English Abstract, 71 pages.
Jia,Y., "Research of Wireless Network''s Access Technology Based on IPv6," Dissertation Submitted to Hebei University of Technology for Master Degree Computer Applied Technology, Jan. 2006, with the English Abstract, 49 pages.
3GPP TS 23.682 V15.5.0, "3rd Generation Partnership Project; Technical Specification Group Services and System Aspects; Architecture enhancements to facilitate communications with packet data networks and applications (Release 15)," Jun. 2018, 125 pages.
Wanfei, S., "Analyse and Application Research on Control Plane Protocol Stack of TD-LTE System," Thesis Submitted to Tianjin University of Technology for the Master''s Degree, Jun. 2018, with the English Abstract, 67 pages.
Rieger, C., et al., "Notional Examples and Benchmark Aspects of a Resilient Control System," 2010 3rd International Symposium on Resilient Control Systems, Oct. 14, 2010, 8 pages.
Rajalingham, G., "Quality-of-Service Differentiation for Smart Grid Neighbor Area Networks," A thesis submitted to McGill University in partial fulfillment of the requirements for the degree of Master of Engineering, Jul. 2015, 106 pages.
Filsfils, C., et al, "Segment Routing Architecture," Internet Engineering Task Force (IETF), Request for Comments: 8402, Jul. 2018, 32 pages.

(56) References Cited

OTHER PUBLICATIONS

Nokia et al, "Correcting AMF behaviour for Service Request that is not integrity protected," S2-1903668, SA WG2 Meeting #132, Apr. 8-12, 2019, 376 pages.

* cited by examiner

TRANSPORTING MTNC-ID OVER SRV6-ENABLED DATAPLANE FOR 5G TRANSPORT

CROSS-REFERENCE TO RELATED APPLICATIONS

This application is a continuation of International Application No. PCT/US2019/044416 filed Jul. 31, 2019, by Futurewei Technologies, Inc., and titled "Transporting MTNC-ID over SRV6-Enabled Dataplane for 5G Transport," which is related to International Application No. PCT/US2019/044422 filed on Jul. 31, 2019 by Futurewei Technologies, Inc., and titled "Transporting MTNC-ID over SRV6-Header for 5G Transport," and International Application No. PCT/US2019/044427 filed on Jul. 31, 2019 by Futurewei Technologies, Inc., and entitled "Transporting a Multi-Transport Network Context Identifier (MTNC-ID) Across Multiple Domains," all three of which are hereby incorporated by reference in their entireties.

TECHNICAL FIELD

The present disclosure is generally related to network communications, and specifically to various systems and methods for transporting a multi-transport network context identifier (MTNC-ID) over segment routing version 6 (SRV6)-enabled dataplane for fifth generation (5G) transport.

BACKGROUND

Traffic engineered (TE) mobile network backhauls use provisioning based on, more or less, static engineering estimates. These estimates may be changed, and traffic engineering may be configured periodically based on demand and other performance criteria. However, such a traffic engineering process may take a long time (e.g., on the order of weeks or months), and thus may not be suitable for networks having dynamically changing contexts, such as the 5G mobile networks. It is desirable to provide dynamically traffic engineered paths in backhaul networks to meet the need of changing traffic demands.

SUMMARY

A first aspect relates to a method performed by a Next Generation Node B (gNB) for transporting a Multi-Transport Network Context Identifier (MTNC-ID) over a Segment Routing Version 6 (SRV6) enabled data plane for 5G transport. The method includes setting an indicator in a flags field of a SRV6 header of a data packet to indicate that an MTNC-ID type-length-value (TLV) is included in a TLV field of the SRV6 header. The MTNC-ID TLV for the MTNC-ID is inserted in the TLV field of the SRV6 header of the data packet. The data packet with the SRV6 header containing the MTNC-ID is transmitted over the SRV6 enabled data plane to a next node along a forwarding path corresponding to the MTNC-ID.

A second aspect relates to a method performed by an egress autonomous system boundary router (ASBR) for transporting an MTNC-ID over a SRV6 enabled data plane for 5G transport. The method receives a data packet having a SRV6 header comprising a segment list. The method processes the segment list. After processing a last segment of the segment list, the method determines whether a TLV field of the SRV6 header of the data packet includes an MTNC-ID TLV associated with the segment list, and if so, extracts an MTNC-ID from the MTNC-ID TLV associated with the segment list. The MTNC-ID is inserted into a data plane header of the data packet. The data packet with the MTNC-ID in the data plane header of the data packet is transmitted to an ASBR of a next domain based on a forwarding path corresponding to the MTNC-ID.

Optionally, in a first implementation according to any of the preceding aspects, the MTNC-ID is associated with a set of resource provisioning requirements for one or more transport networks on the forwarding path to provision transport resources for forwarding traffic on the forwarding path.

Optionally, in a second implementation according to any of the preceding aspects or implementation of any preceding aspect, the MTNC-ID TLV is 32 bits comprising an MTNC-ID type field, a length field, and a 2 octets (16 bits) MTNC-ID field.

Optionally, in a third implementation according to any of the preceding aspects or implementation of any preceding aspect, the set of resource provisioning requirements comprises a combination of quality of service (QoS) requirements, class of service (CoS) requirements, a resilience requirement, and an isolation requirement, according to which transport resources of a transport network are provisioned for routing traffic between two service end points.

Optionally, in a fourth implementation according to any of the preceding aspects or implementation of any preceding aspect, the MTNC-IDs for each domain and for each traffic class are established by a domain orchestrator (DO).

Optionally, in a fifth implementation according to any of the preceding aspects or implementation of any preceding aspect, the data plane header is a Network Service Header (NSH), and wherein inserting the MTNC-ID into the data plane header of the data packet comprises prefixing the MTNC-ID as part of the NSH of the data packet.

Optionally, in a sixth implementation according to any of the preceding aspects or implementation of any preceding aspect, the data plane header is a User Datagram Protocol (UDP) header, and wherein inserting the MTNC-ID into the data plane header of the data packet comprises encapsulating the MTNC-ID in the UDP header of the data packet.

Optionally, in a seventh implementation according to any of the preceding aspects or implementation of any preceding aspect, the forwarding path is created by a software-defined network (SDN) controller, and wherein the MTNC-ID is binded to the forwarding path by the SDN controller.

For the purpose of clarity, any one of the foregoing implementation forms may be combined with any one or more of the other foregoing implementations to create a new embodiment within the scope of the present disclosure. These embodiments and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques. The disclosure should in no way be limited to the illustrative implementations, drawings, and techniques illustrated below, including the exemplary designs and implementations illustrated and described herein, but may be modified within the scope of the appended claims along with their full scope of equivalents.

Network services requested by users are often associated with requirements, e.g., quality of service (QoS) requirements, which need to be met so that the users may receive levels of services as contracted. Transport networks that are configured to provide transport services also need to provision transport resources according to these requirements for forwarding traffic.

The present disclosure provides various embodiments for enabling an SRV6 data plane to carry an MTNC-ID (which is a type of metadata). The MTNC-ID is processed for each domain to route data packets using a pre-established path in each domain that corresponds to the MTNC-ID. The MTNC-ID represents a combination of QoS requirements, a class of service (CoS) requirement, a resilience requirement, and/or an isolation requirement according to which transport resources of a transport network are provisioned for routing traffic between two service end points.

The User Plane Function (UPF) is a fundamental component of a 3GPP 5G core infrastructure system architecture. The UPF provides the interconnect point between the mobile infrastructure and the Data Network (DN), (i.e., encapsulation and decapsulation of General Packet Radio Services (GPRS) Tunneling Protocol for the User Plane (GTP-U)); the Protocol Data Unit (PDU) session anchor point for providing mobility within and between Radio Access Technologies (RATs), including sending one or more end marker packets to the gNB; packet routing and forwarding; application detection; per-flow QoS handling; and traffic usage reporting. As will be described herein, the UPF has four distinct reference points: (1) N3: Interface between the radio access network (RAN) (e.g., one or more base stations) and the (initial) UPF; (2) N9: Interface between two UPF's (i.e., the Intermediate I-UPF and the UPF Session Anchor); (3) N6: Interface between the data network (DN) and the UPF; and (4) N4: Interface between the session management function (SMF) and the UPF. The disclosed embodiments are applicable if any of N3, N9, or N6 is a SRV6-enabled network. Additional benefits of the disclosed embodiments can be ascertained from the following description.

Figure 1:
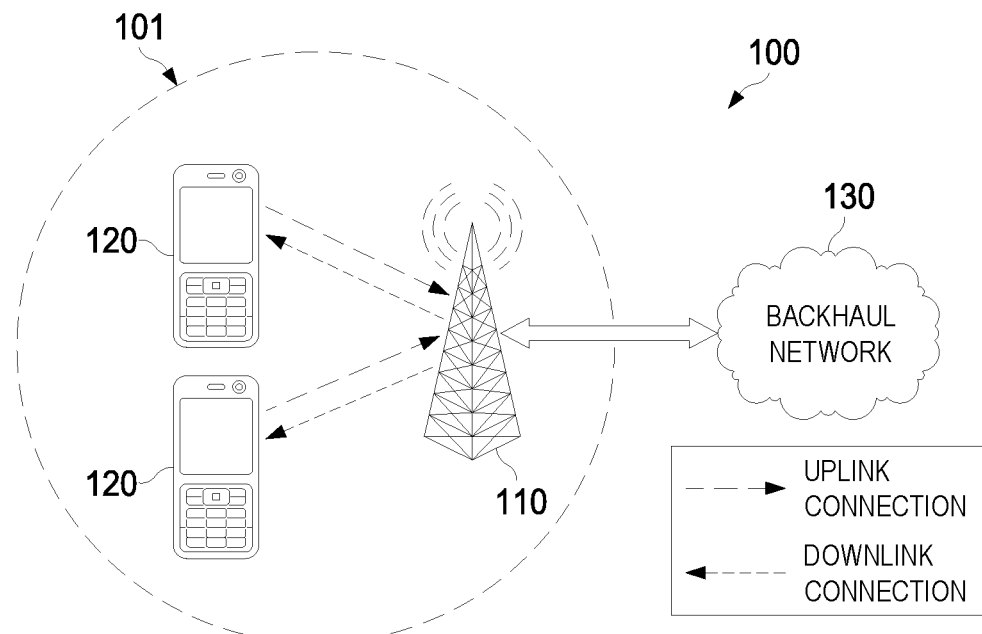
FIG. 1 is a diagram of a wireless communications network in accordance with an embodiment of the present disclosure.

FIG. 1 is a diagram illustrating an embodiment of a wireless communications network 100 for communicating data. The network 100 comprises a base station 110 having a coverage area 101, a plurality of mobile devices 120, and a backhaul network 130. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB), a next generation gigabit NodeB (gNB), a transmit/receive point (TRP), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

Figure 2:
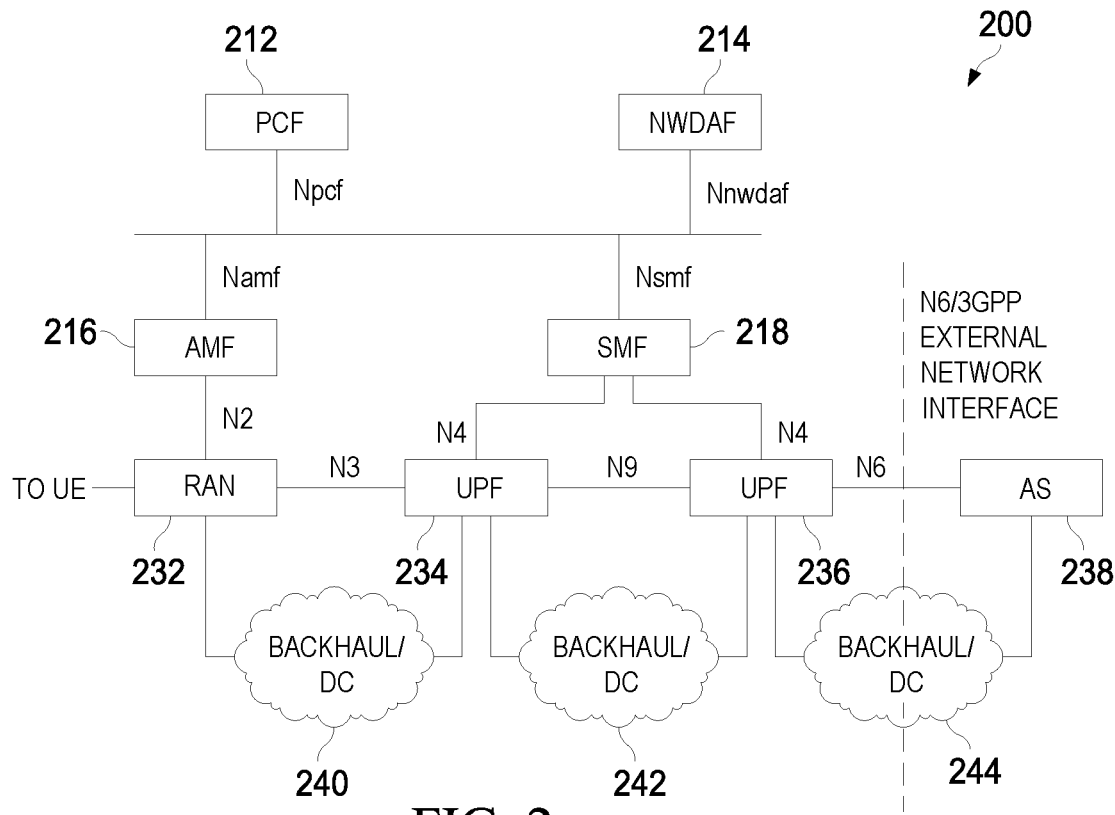
FIG. 2 is a diagram showing Third Generation Partnership Project (3GPP) control plane functions for setting up user plane connections in accordance with an embodiment of the present disclosure.

FIG. 2 is a diagram 200 illustrating Third Generation Partnership Project (3GPP) control plane functions for setting up user plane connections in the wireless communications network 100 of FIG. 1. Specifically, FIG. 2 illustrates 3GPP control plane functions (e.g., an access and mobility management function (AMF), an SMF, etc.) that provide access and session handling capabilities for setting up user plane connections across a segment N3 (e.g., a communication segment between a radio access network (RAN) and a user plane Function (UPF) (also referred to as an interface N3)), across a segment N9 (e.g., a segment between UPFs (also referred to as an interface N9)), and across a segment N6 (e.g., a segment between a UPF and an edge network and/or other external destinations (also referred to as an interface N9)).

The control plane functions shown in FIG. 2 include a policy control function (PCF) 212, a network data analysis function (NWDAF) 214, an AMF 216, and a SMF 218. 3GPP specifications, including Technical Specification (TS) 23.501 and TS 23.502, describe these control plane and user plane functions in detail. For example, the SMF 218 is responsible for handling individual user sessions, in particular, Internet Protocol (IP) addresses, routing, and mobility. The SMF 218 provisions user sessions subject to network and subscription policy as defined in the PCF 212. The NWDAF 214 is responsible for network data analysis, i.e., analysis on data from various 3GPP network functions (NFs). The AMF 216 is responsible for handling connection and mobility management.

Each of the control plane functions communicate with other functions through their specific interfaces. For example, the PCF 212 communicates via an interface Npcf, the NWDAF 214 communicates via an interface Nnwdaf, the AMF 216 communicates via an interface Namf, and the SMF 218 communicates via an interface Nsmf.

In the data plane, UEs may access a RAN 232 for wireless communication, and traffic may be routed between the RAN 232 and a UPF 234 via N3, between the UPF 234 and a UPF 236 via N9, and between the UPF 236 and an application server (AS) 238 via N6. In some cases, the interface between the UPF 236 and the AS 238 may be N6 or a 3GPP external network interface.

The end-to-end connections for N3, N9, and N6 may traverse a backhaul network or a data center (DC) network 240, 242, 244. For example, the connection over N3 traverses a backhaul/DC network 240, the connection over N9 traverses backhaul/DC network 242, and the connection over N6 traverses a backhaul/DC network 244. Each of the backhaul or DC networks may be referred to as a transport network or a domain, and traffic is routed or transported through a transport network corresponding to an interface N3, N6, or N9. The corresponding transport underlay for these interfaces N3, N6, and N9 may need to be traffic engineered to support various 5G use cases. For example, to satisfy requirements such as low latency, and high reliability for data flows, as well as the ability to support dynamically varying demands on network capacity, software defined network (SDN)-controllers (SDN-Cs) in the transport domain may need to get requests from a 3GPP system and provide the path capabilities requested.

Mobile network backhauls use static configuration and provisioning of routers for traffic engineering (TE), where TE is configured periodically (e.g., weekly or monthly) based on demand and other performance criteria. The backhauls provide statically traffic engineered paths for forwarding traffic. However, in 5G systems with a large range of services, low latency paths, and mobility, the demand estimate varies much more dynamically (e.g., in the order of several minutes in the worst cases). To support and provide dynamically traffic engineered paths (e.g., forwarding paths) that accommodate dynamically varying traffic demand, as well as other requirements, MTNC-IDs are associated and applied to data packets in the control plane based on which transport networks provide contract bound services according to the transport network context or the transport context identified by the MTNC-IDs. The terms "transport network context" and "transport context" are used interchangeably throughout the disclosure. Each MTNC-ID may correspond to one forwarding path between two data plane network functions, e.g., UPFs 234 and 236. The forwarding path may include one or more transport networks configured for forwarding traffic on the forwarding path. In one embodiment, the transport network context identified by an MTNC-ID corresponding to a forwarding path may include a set of requirements, such as quality of service QoS requirements, CoS requirements, a resilience requirement, and/or an isolation requirement, according to which transport resources of each transport network on the forwarding path are provisioned for routing traffic on the forwarding path.

In some cases, traffic is transmitted over an end-to-end transmission path from a source network (or a source site) to a destination network (or a destination site). The source network and the destination network are referred to as customer networks (at different sites). In one example, a customer network may be a mobile network, or an edge computing network. In another example, one of the source network and the destination network is a radio access network, and the other one is a mobile core. The following embodiments use 3GPP mobile networks as examples for merely illustrative purposes. Other networks may also be applicable, such as a content delivery network (CDN) or a DC network, without departing from the principle and spirit of the present disclosure.

Communication of traffic between the customer networks (or two sites) may be through one or more backhaul networks or DCs 240, 242, and 244. Thus, traffic is routed from the source network to the destination network through the one or more backhaul networks or DCs. The backhaul networks or DCs for routing traffic between two customer networks may be referred to as transport networks. Traffic communicated between the customer networks through a transport network may also be referred to as being communicated across different domains (or across different sites). The source network, destination network, and the transport network may be viewed as being associated with different domains. In an illustrative example, where the two customer networks may be two different 3GPP mobile networks, the 3GPP mobile networks are associated with 3GPP domains, and the transport network is associated with a transport domain. Thus, in this example, traffic is communicated across 3GPP domains and a transport domain. The mobile networks may also be viewed as being associated with application domains.

Network slicing divides a network service into many parallel network slice instances and distributes functions of each slice instance as independent units based on network conditions and service requirements. Network slicing may allow multiple virtual networks to be created on top of a common shared physical infrastructure, and the virtual networks may then be customized to meet specific needs of applications, services, devices, customers, or operators. For example, in the case of 5G, a single physical network may be sliced into multiple virtual networks that may support different RANs, or different service types running across a single RAN.

A network slice may be associated with a set of resources of the network. For example, a 3GPP slice may be associated with a set of 3GPP network resources. A transport slice may be associated with a set of transport network resources. A transport network slice may correspond to QoS, CoS, resilience and isolation requirements. There may be multiple slice instances corresponding to a slice, and they may be dedicated or shared. In this way, an MTNC-ID may also be associated with a network slice.

Figure 3:
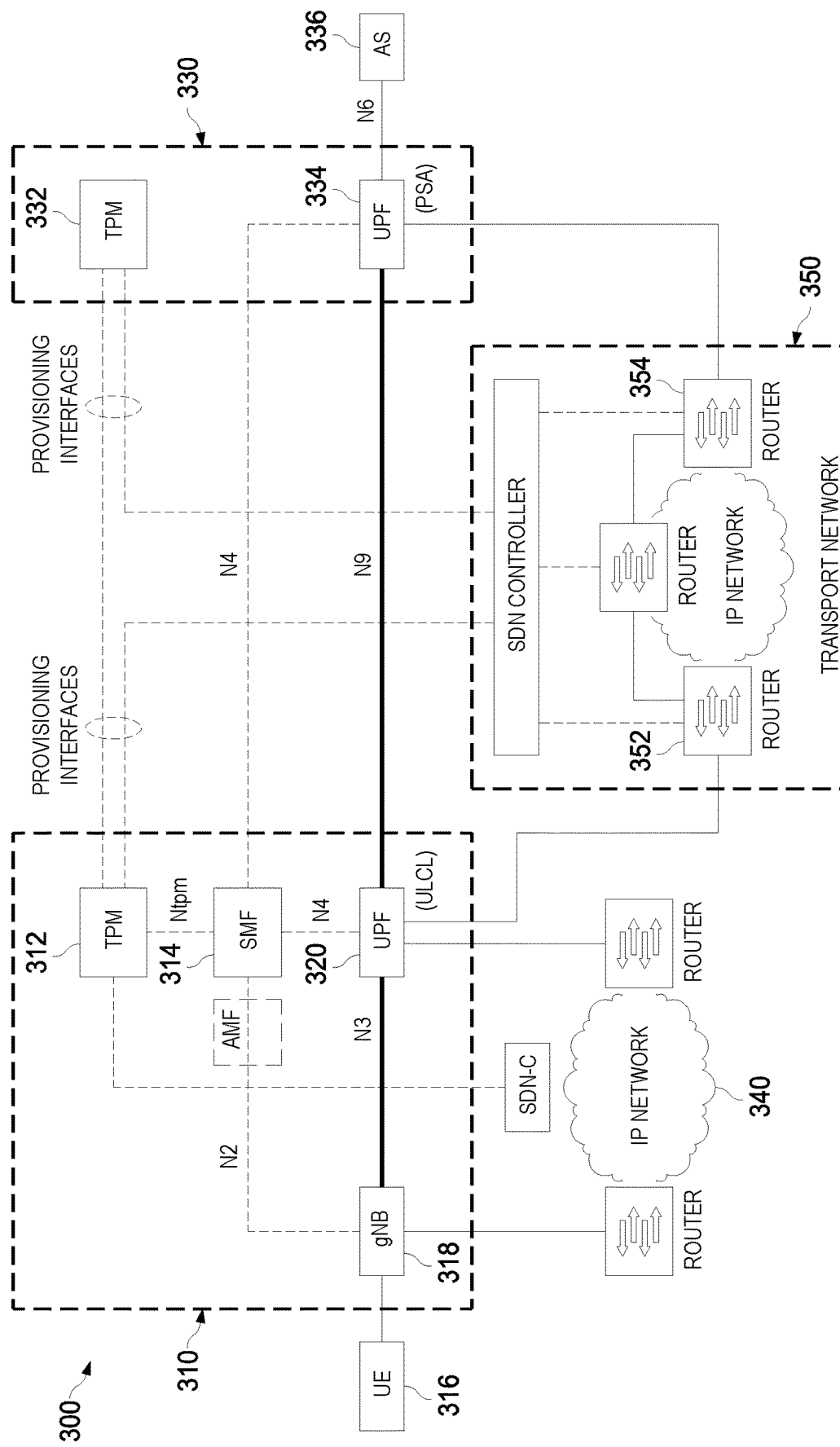
FIG. 3 is a diagram of a communications system highlighting transport networks used for forwarding traffic between mobile networks in accordance with an embodiment of the present disclosure.

FIG. 3 is a diagram illustrating an embodiment of a communications system 300 highlighting transport networks used for forwarding traffic between a mobile network 310 and a mobile network 330 using MTNC-IDs. FIG. 3 shows that MTNC-IDs are shared by the different transport networks in the communications system 300 (e.g., the application (i.e., mobile network) domain and the transport domain).

In FIG. 3, mobile network functions are deployed across two sites (i.e., the mobile networks 310 and 330, (referred to as Site 1, Site 2, respectively), and a transport network 350 in between. As shown, the mobile network 310 includes a transport path manager (TPM) 312, and a SMF 314. The mobile network 330 includes a TPM 332. A UE 316 communicates with a gNB 318 in the mobile network 310. Traffic may be transmitted from the gNB 318 to a UPF 320 of the mobile network 310, routed by the transport network 350 on a path including PE routers 352 and 354, forwarded to a UPF 334 of the mobile network 330, and then delivered to an application server (AS) 336. Communications between the UE 316 and the gNB 318 traverse a radio network. Communications between the gNB 318 and the UPF 320 is through the interface N3 traversing a transport network 340 (which is an IP network). Communications between the UPF 320 and the UPF 334 is through the interface N9 traversing a backhaul network (or a transport network) 350. Communication between the UPF 334 and the AS 336 is through the interface N6 that may traverse another data center (or a transport network). Each transport network includes an SDN-C provisioning and managing router. The path for communicating traffic between the UE 316 and the AS 336 may thus include multiple segments, i.e., a N3 segment, a N9 segment, and a N6 segment.

A TPM (e.g., TPM 312 or TPM 332) is a control function of a customer network, and one TPM is configured per customer network (or site). A TPM of a network (e.g., a mobile network) may be configured to collect data, e.g., user session information, traffic volume, etc., regarding traffic demand of the network, collect topology information of a transport network that is used to forward traffic between the network and other networks, negotiate with a TPM of another network for traffic matrix, and collect performance data regarding transport paths of a transport network for routing traffic between the network and other networks through the transport network. The TPM may be configured to dynamically determine whether to request to configure a transport path in a transport network for routing traffic from the network to another network through the transport network, based on the collected data, estimates and/or requirements, such as QoS determined, demands estimated, traffic matrix negotiated, PE routers of the transport network that are determined, and one or more transport path configuration constraints.

For example, 3GPP TS 23.501 or 5G supports a number of service level guarantees for QoS, such as ultra-low latency, ultra-high reliability, and latency determinism to best effort. 3GPP UPFs classify and allocate resources for packet data network (PDN) connections and flows according to QoS levels and slice information. In the transport networks, resources are granted based on the service level guarantees by the mobile network.

In FIG. 3, the N3 segment between the gNB 318 and the UPF 320 is over the transport network 340 at Site 1, which may be a data center or a center office (DC/CO). In the N9 segment, in the case as shown in FIG. 3, there are three transport segments (or paths), a transport segment at each mobile network site (Site 1 and Site 2), a transport segment from the UPF 320 to the router 352 of the transport network 350, a transport segment from the router 354 to the UPF 334, and a transport (or backhaul) segment in between routers 352 and 354. In order for each transport network to provision transport resources and provide a service of an agreed level, each transport network may consider the estimation of traffic and provisioning by TPMs and SDN controllers across the service and transport domains, and the provisioning of MTNC-IDs shared by the application (the mobile network) domain and the transport domain, where the MTNC-IDs indicate different service levels and/or slice information. The MTNC-IDs may be per CoS in the transport domain(s) that corresponds to a data plane segment like N3 or N9.

Figure 4:
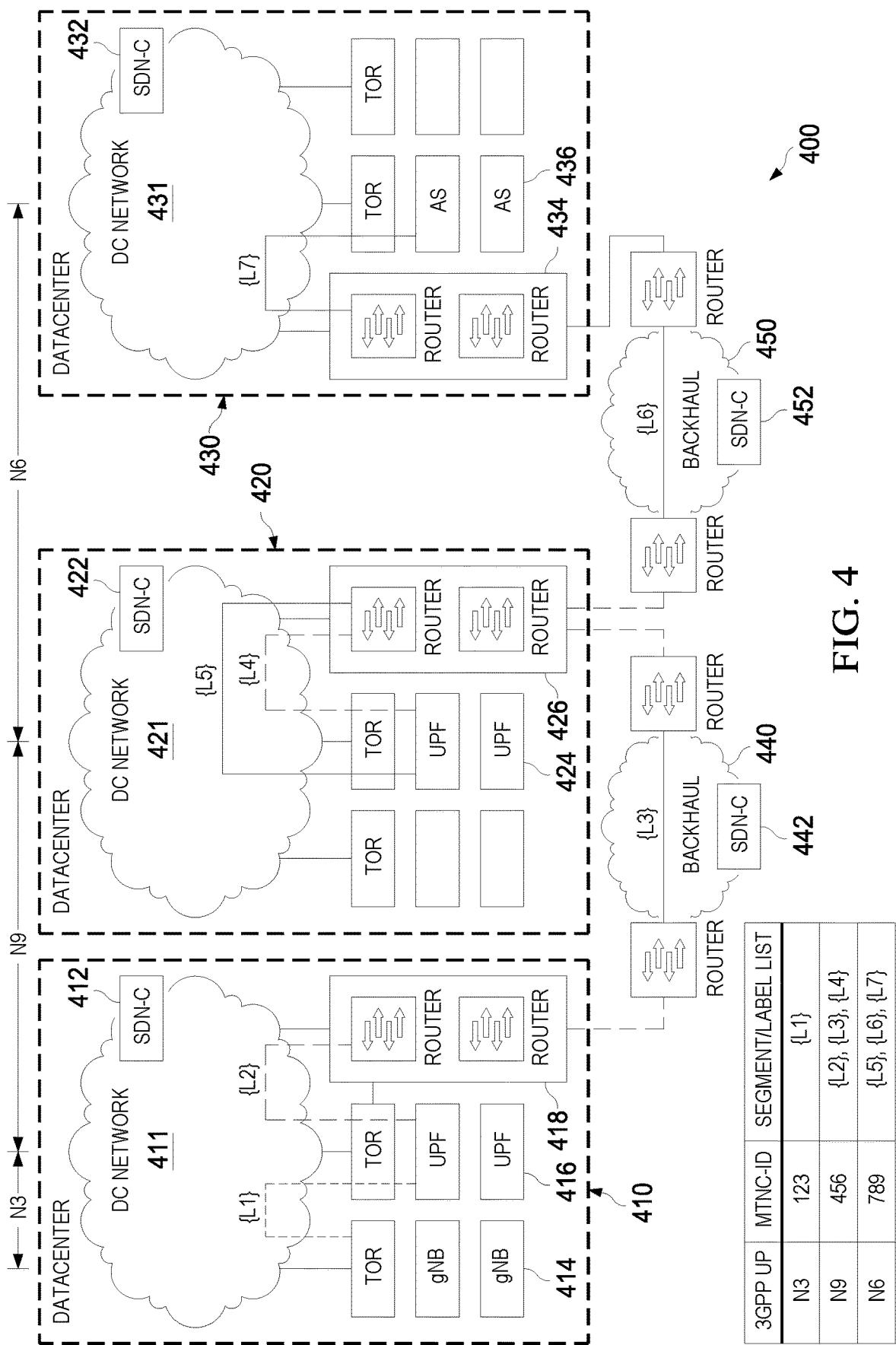
FIG. 4 is a diagram of a communications system highlighting transport segments in accordance with an embodiment of the present disclosure.

FIG. 4 is a diagram illustrating an embodiment of a communications system 400 highlighting transport segments. FIG. 4 shows the relationship between MTNC-IDs, 3GPP data plane segments, and transport segments. In FIG. 4, service layer user plane segments (e.g., N3, N9, N6 segments) are located in different data centers interconnected by backhaul and data center transports, and there may be multiple connection segments per 3GPP data plane segment. For example, the N9 user plane segment may use multiple transport segments across data centers and/or backhaul transports. The transport segments may be represented by a list of labels or segment numbers, e.g., {L1}, {L2}, . . . {L7}.

As shown, the communications system 400 includes a data center 410, a data center 420, and a data center 430. Each of the data centers may correspond to a customer network. The data centers include routers routing traffic in or out of the respective data centers, top of rack (TOR) and/or end of row (EOR) switches. The data center 410 includes gNBs 414 providing access services. A DC network 411 is provided in the data center 410 for forwarding traffic within the data center 410. An SDN-C 412 is configured to provision and manage routing for the DC network 411. Within the data center 410, traffic may be transmitted by a gNB 414 to one of the UPFs 416 (i.e., segment {L1}), and forwarded from one of the UPFs 416 to one of the routers 418 (i.e., segment {L2}). Transport services for {L1} and {L2} are provided by the DC network (or transport network) 411 within the data center 410.

The data center 420 includes a DC network 421 for forwarding traffic within the data center 420. An SDN-C 422 is configured to provision and manage routing for the DC network 421. Within the data center 420, incoming traffic may be received and forwarded by one of the routers 426 to one of the UPFs 424 (i.e., segment {L4}), and outgoing traffic may be forwarded from one of the UPFs 424 to one of the routers 426 (i.e., segment {L5}). Transport services for {L4} and {L5} are provided by the DC network (or transport network) 421 within the data center 420.

The data center 430 includes a DC network 431 for forwarding traffic within the data center 430. An SDN-C 432 is configured to provision and manage routing for the DC network 431. Incoming traffic may be received by one of the routers 434 and forwarded to one of application servers (AS) 436 (i.e., segment {L7}). Transport services for {L7} are provided by the DC network (or transport network) 431 within the data center 430.

Traffic transmitted from the data center 410 to the data center 420 may be transported by a backhaul network 440, e.g., in a segment {L3}. An SDN-C 442 is configured to provision and manage routing for the backhaul network 440. Traffic transmitted from the data center 420 to the data center 430 may also be transported by a backhaul network 450, e.g., in a segment {L6}. An SDN-C 452 is configured to provision and manage routing for the backhaul network 450.

For traffic transmitted from the gNB 414 to an application server (AS) 436, the traffic may pass through transport segments {L1}, {L2}, ... {L7}. Services provided on each of the transport segments meet the requirements of a level of service of a corresponding user plane segment, e.g., N3 or N9.

In some embodiments, MTNC-IDs are provided to indicate or identify the requirements. As described above, an MTNC-ID identifies the MTNC or transport context for a user plane segment (e.g., N3 or N9), where transport resources of each transport segment along the user plane segment are provisioned according to the transport context. As discussed above, there may be one or more transport segments (consequently, one or more transport networks) corresponding to one user plane segment. For example, the N9 segment corresponds to transport segments {L2}, {L3}, and {L4}. Thus, all the transport segments {L2}, {L3}, and {L4} share one MTNC-ID of the corresponding user plane segment.

In the following, a user plane segment is referred to as a connection path between two service end points, i.e., two user plane network functions (e.g., between the gNB 414 and the UPF 416, between the UPFs 416 and 424, or between the UPF 424 and the AS 436). A connection path is established for a user session or a PDU session. For example, for transmitting traffic from the data center 410 to the data center 430, three connection paths are established, i.e., from the gNB 414 to the UPF 416, from the UPF 416 to the UPF 424, and from the UPF 424 to the AS 436. The connection path may exist for the duration of the user session. A connection path may include one or more transport segments. For example, the connection path from the gNB 414 to the UPF 416 includes transport segment {L1}. The connection path from the UPF 416 to the UPF 424 includes transport segments {L2}, {L3}, and {L4}. The connection path from the UPF 424 to the AS 436 includes transport segments {L5}, {L6}, and {L7}. A connection path may also be referred to as a forwarding path, a tunnel, or a connection segment in the following embodiments.

The MTNC or transport context identified by an MTNC-ID may include the requirements for a certain level of service. The requirements may include CoS requirements, a set of QoS requirements, such as a bandwidth, a latency, jitter, etc., a resilience requirement, such as a protection level (e.g., 1+1, 1+1+restoration, or shared protection, etc.), and/or an isolation requirement, such as hard isolation, soft isolation, or no isolation. Based on the requirements, a network slice (also referred to herein as a transport slice) may be generated to provide routing services. The network slice corresponds to resources provisioned/allocated according to the requirements associated with the MTNC-ID.

CoS requirements indicate a classification of services into categories so that traffic of the services is treated according to the classification. CoS may be associated with a set of QoS characteristics for a network slice or service. For example, 3GPP TS 23.501, Release 15, section 5.7.4, shows mapping from a 5G QoS identifier (5QI) that maps CoS to QoS characteristics. For example, a 5QI value "1" corresponds to a set of QoS characteristics of 100 milliseconds (ms) packet delay budget, and a 2000 ms averaging window. Hard isolation means that all transport resources (including resources in all layers, packet resources, and/or optical resources) allocated for a virtual network connection (VNC) are dedicated for the VNC without sharing with another VNC. Soft isolation is generally the same as hard isolation except that optical resources may be shared with other VNCs. No isolation means that the VNC is permitted to share, with other VNCs, all transport resources.

An MTNC-ID is shared by the transport network, domains, and the 3GPP (or mobile network) domains on e.g., per (connection) path, class of service, and isolation basis. In the case that a connection path includes multiple transport segments across different domains (e.g., mobile network domains and transport domains), the same MTNC-ID is shared across the different domains. As shown in FIG. 4, an MTNC-ID "123" is used for the N3 segment, which includes the transport segment {L1}. An MTNC-ID "456" is used for the N9 segment, which includes the transport segments {L2}, {L3}, and {L4}. The MTNC-ID "456" is shared across the data center 410 (including the DC network 411), the backhaul network 440, and the DC network 421 in the data center 420. An MTNC-ID "789" is used for the N6 segment, which includes the transport segments {L5}, {L6}, and {L7}. The MTNC-ID "789" is shared across the data center 420 (including the DC network 421), the backhaul network 450, and the DC network 431 in the data center 430.

MTNC-IDs may be set up by estimating demand on each forwarding (or connection) path between two service end points. It is noted that the 3GPP connection segments (user plane segments), e.g., the N3 and N9 segments identified by GTP tunnel endpoint identifiers (TEIDs), only exist for the duration of a PDN session. It should also be noted that an MTNC-ID is not per user (or PDN) session, and the lifetime of the MTNC-ID is based on negotiation across TPMs and SDN-Cs for that connection path and context.

MTNC-IDs may be created and managed through negotiations between TPMs and SDN controllers. Each MTNC-ID is uniquely created for each connection path. A connection path may correspond to multiple MTNC-IDs each indicating a different set of resource provisioning requirements. The MTNC-IDs may then be bound to 3GPP data plane segments (e.g., GTP TEIDs). Details will be provided in the following for carrying the MTNC-IDs in the data plane so that transport entities on-path may provide the level of service guaranteed.

A mobile network may provision resources to handle QoS, compute, and storage based on a slice and a service selected by a user. The provisioned resources may correspond to a "service slice." For obtaining transport resources corresponding to the requirements of a service slice in the mobile network domain, it would be desirable to provide a means to request and provision these transport resources, and to carry policy binding information in data packets so that the transport domain may provide the right level of service according to the policy binding information. The policy binding information may include MTNC-IDs that need to be set up before being applied to the data packets.

Figure 5:
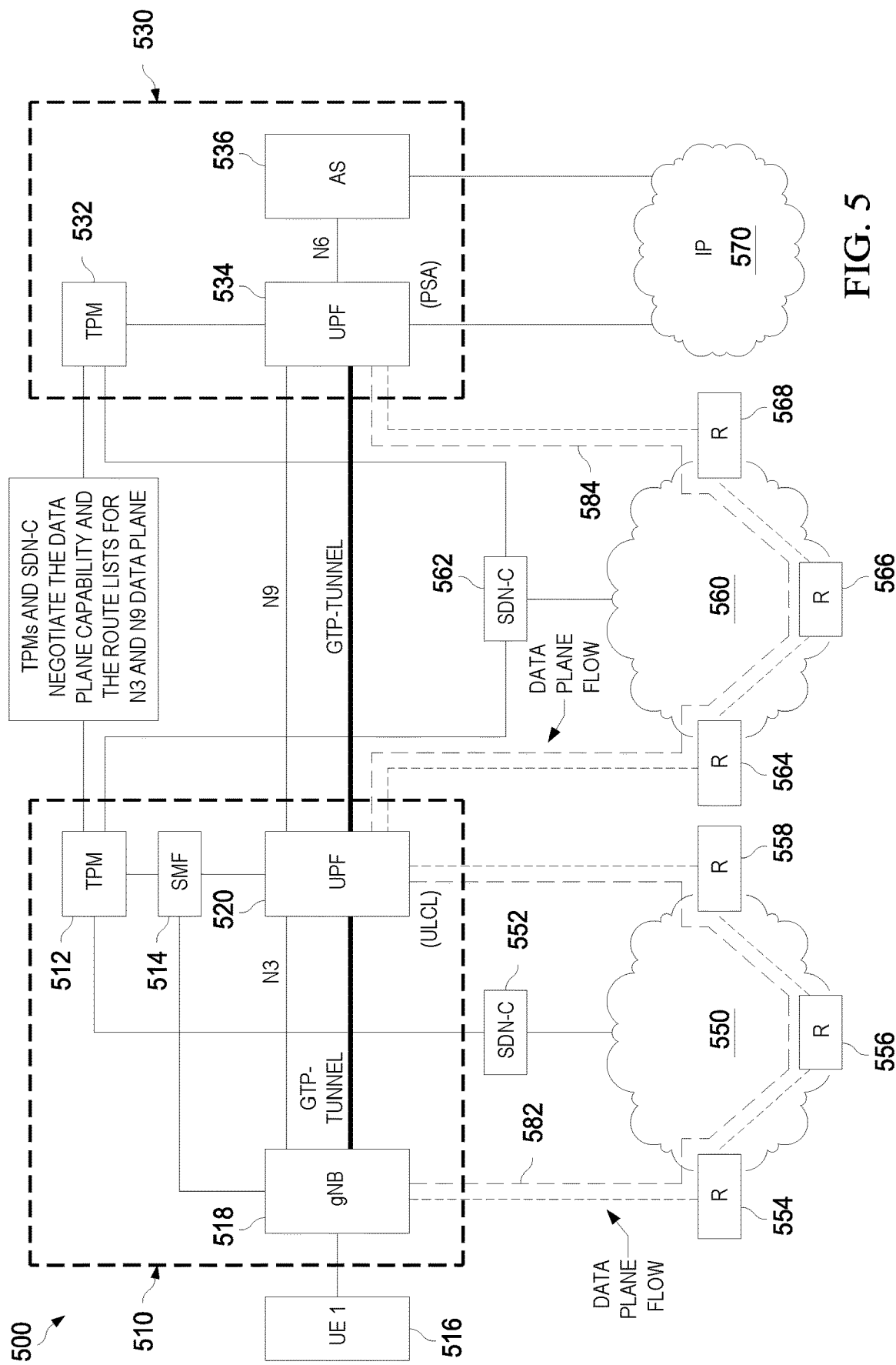
FIG. 5 is a diagram of a communications system in accordance with an embodiment of the present disclosure.

FIG. 5 is a diagram illustrating an embodiment of a communications system 500. FIG. 5 illustrates the negotiation of a transport context in the control plane components across TPMs and SDN-Cs. The negotiation binds the transport data plane technology and the associated route object such that a TPM may be able to enforce the corresponding transport context to subsequent control elements, such as a SMF and a UPF. Based on the transport context that is passed down to gNBs and UPFs, the gNBs and the UPFs may be able to add an MTNC-ID corresponding to the transport context to the data packets, which may be routed according to the transport context.

As shown, the communications system 500 includes a mobile network 510 and a mobile network 530 with traffic communicated between the two mobile networks 510 and 530. The mobile network 510 includes a TPM 512 and a SMF 514. The mobile network 530 includes a TPM 532. Traffic of a user session initiated by a UE 516 is transmitted to a gNB 518 in the mobile network 510, then forwarded to a UPF 520 of the mobile network 510, to a UPF 534 of the mobile network 530, and then to an AS 536 of the mobile network 530. The N3 segment between the gNB 518 and the UPF 520 traverses a transport network 550. The N9 segment between the UPFs 520 and 534 traverses a transport network 560. The N6 segment between the UPF 534 and the AS 536 traverses an IP network 570. The TPMs 512 and 532 and SDN-Cs 552 and 562 of the transport networks 550, 560, and 570 negotiate with each other for data plane capabilities and route lists for transporting traffic along the N3 and N9 segments in the data plane. When the user session is initiated, the SMF 514 may pass an MTNC-ID to the gNB 518, and the UPFs 520 and 534. The gNB 518 or the UPF 520 may add the MTNC-ID to the data packets received, and forward the packet to a transport network 550.

For data flow transmission, a GTP-tunnel is established between the gNB 518 and the UPF 520, and between the UPF 520 and the UPF 534. For the N3 segment, data flows in the data plane are transported in a path 582, i.e., from the gNB 518 to routers 554, 556 and 558 of the transport network 550, and then to the UPF 520. For the N9 segments, the data flows are transported in a path 584, i.e., from the UPF 520 to routers 564, 566 and 568 of the transport network 560, and then to the UPF 534.

Figure 6:
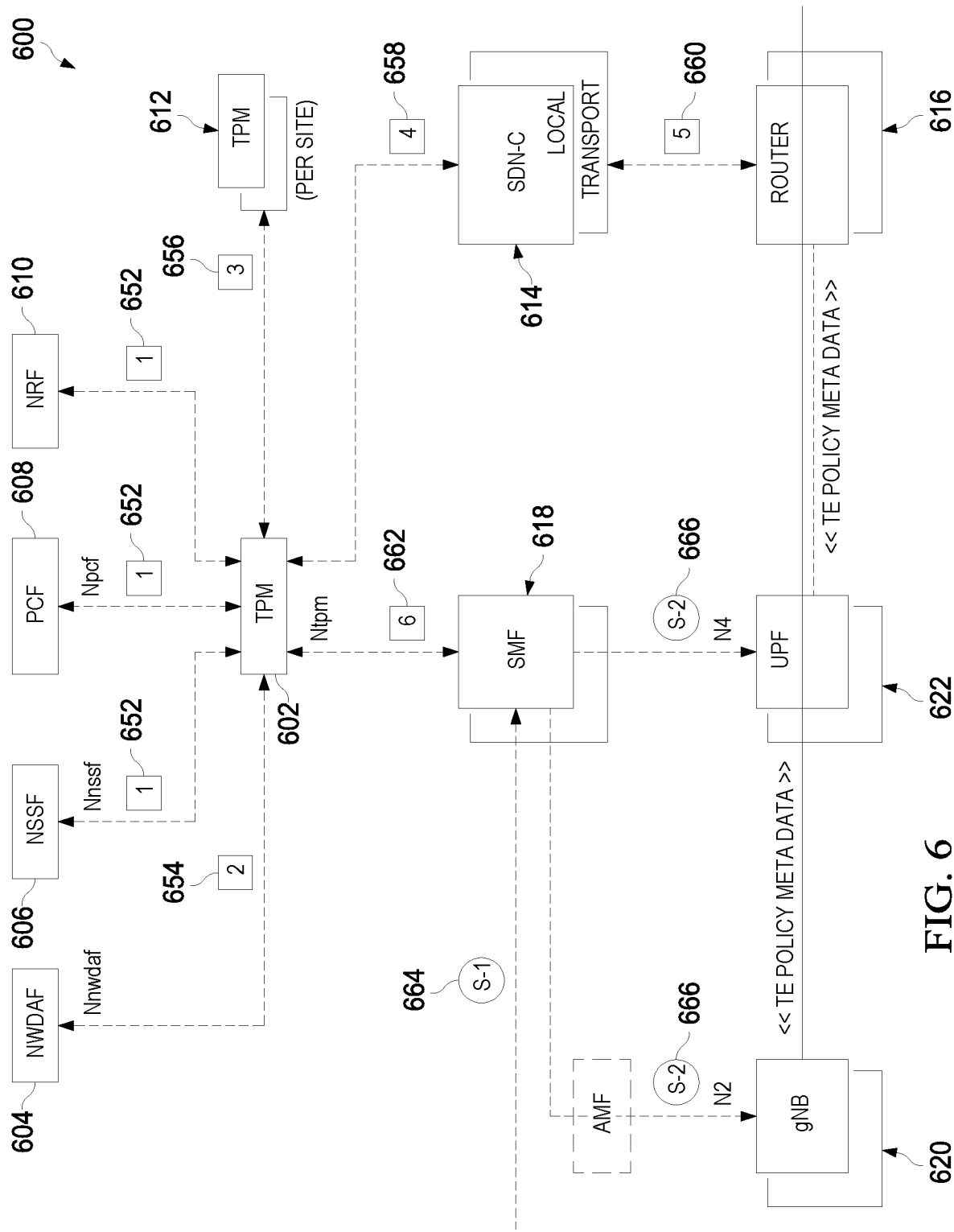
FIG. 6 is a diagram illustrating communications between control plane functions, highlighting setup of multi-transport network context-identifiers (MTNC-IDs) in the control plane in accordance with an embodiment of the present disclosure.

FIG. 6 is a diagram 600 illustrating communications between control plane functions, highlighting a setup of MTNC-IDs in the control plane. FIG. 6 shows a TPM 602, a NWDAF 604, a network slice selection function (NSSF) 606, a PCF 608, a network resource function (NRF) 610, one or more TPMs 612, one or more SDN-Cs 614, one or more SMF 618, and one or more gNBs 620. The TPM 602, the NWDAF 604, the NSSF 606, the PCF 608, the NRF 610, and the one or more SMFs 618 belong to a first customer network (first site). Each of the TPMs 612 belongs to a second customer network (second site), where traffic may be transmitted between the first customer network and each of the second customer networks. Each of the SMFs 618 is configured to manage a set of UPFs 622. Each of the gNBs 620 provides access services to UEs in the first customer network.

Each of the SDN-Cs 614 belongs to a transport network, which may be a local transport network of a customer network, such as the DC network 411 of the data center 410 in FIG. 4, or a non-local transport network of a customer network, such as the backhaul network 440 in FIG. 4. Each SDN-C 614 manages multiple routers 616 within a corresponding transport network. As shown, traffic is transmitted from a gNB 620 to a UPF 622, which then forwards the traffic to a router 616.

In general, communications between the control plane functions includes determining a traffic matrix from end-to-end (E2E) (steps 652, 654 and 656), and negotiating transport resources and binding MTNC or tokens (steps 658, 660 and 662). When a mobile user session is created (step S-1 664), a network policy, and an MTNC-ID are installed in a UPF 622. When both the UPF 622 and the router 616 (from step 660) have the same binding information for the policy, resources along the transport path may be assigned accordingly.

The TPM 602 may obtain configuration information from databases. As shown, the TPM 602 may obtain information from the NSSF 606, the PCF 608, and the NRF 610 (step 652). The TPM 602 may obtain topology and configuration information about the first customer network from the NRF 610 and other configuration databases. The TPM 602 may subscribe or poll for slice and network policy information from the NSSF 606 and PCF 608. Information obtained here may be used in subsequent steps to derive information about connection paths and traffic matrix. Although FIG. 6 shows that the TPM 602 obtains the information from the NSSF 606, the PCF 608, and the NRF 610 at the same step 652, obtaining the information from the NSSF 606, the PCF 608, and the NRF 610 may be performed in different orders, at different time or the same time.

The TPM 602 may derive demand estimates. The TPM 602 may subscribe, from the NWDAF 604 (step 654) (and may also subscribe from a UPF 622, a SMF 618, or any other session and data path nodes), for data that may be used to calculate and estimate traffic on each connection path. The TPM 602 may also use historical data and other network policy information for deriving the estimates. The demand estimates may be used for negotiating bandwidth, latency, and other QoS provisioning with other TPMs, such as the TPM 612, for transmission from the first customer network to other customer networks.

The TPM 602 may negotiate traffic matrices with other TPMs 612 (step 656). The TPM 602 may use estimates derived at step 654 to agree across the networks on traffic estimates per connection path. During the communications with the other TPMs 612, the TPM 602 and a TPM 612 may additionally exchange MTNC-IDs (or tokens) assigned or determined end to end (E2E) per traffic class or CoS and connection path. An MTNC-ID (token) handling system may be provided for assigning unique MTNC-IDs per traffic class and connection path.

The TPM 602 may program MTNC-IDs at each SDN-C 614. The TPM 602 may send MTNC-IDs assigned/determined at step 656 to each SDN-C 614 on a connection path (corresponding to a 3GPP user plane segment, e.g., N3 or N9 segment) (step 658). The MTNC-IDs (and thus, the associated service class information, such as QoS requirements bandwidth, latency, etc., which is identified by the MTNC-IDs) are used by each SDN-C 614 in each transport domain to program the respective transport network for providing transport services according to the MTNC-IDs.

Each SDN-C 614 may program routers 616 managed by SDN-C 614 with the MTNC-IDs received from the TPM 602 (step 660). An SDN-C 614 may program a TE policy and parameters to routers on a TE transport path or segment and replies to the TPM 602 (step 658). If multiple SDN-Cs 614 are being programmed corresponding to an MTNC-ID, such as the SDN-Cs 412, 422 and 442 are programmed with the MTNC-ID "456" in FIG. 4, only after all SDN-Cs 614 accept the TE policy, does the TPM 602 commit the MTNC-ID.

Each SMF 618 may subscribe for the MTNC-IDs. A SMF 618 manages a set of UPFs 622 in the corresponding customer network. A SMF 618 may request the TPM 602 to provide MTNC-IDs for forwarding paths between each pair of UPFs 622 (corresponds to a 3GPP data plane segment) (step 662). If the SMF 618 has estimates for the forwarding path, it may provide information about the forwarding path to the TPM 602. The TPM 602 may respond with subscription and notification for each MTNC-ID (step 662), including CoS provided, slice information (for isolation), and/or load information. The TPM 602 may update the status of MTNC-IDs on a continual basis with notifications.

A SMF 618 may receive an incoming session request (step 664). When the SMF 618 receives a session establishment request initiated by a UE, it handles the request and checks information about the request, e.g., a network policy, QoS, and slice information of the request. The SMF 618 may then use the policy, QoS and slicing information to derive an MTNC-ID. The SMF 618 may determine the MTNC-ID from a list of MTNC-IDs received from the TPM 602.

The SMF 618 may configure the UPFs 622 with the derived MTNC-ID (step 666). In some embodiments, the MTNC-ID may be configured in the N4 UPF configuration procedure. The N4 UPF configuration parameters may remain the same as specified in the 3GPP TS 23.601, with the addition of the MTNC-ID, which is also configured to the UPFs 622. Each UPF 622 may include (or add, or insert) the MTNC-ID in each data packet of the user session, as will be further described below. Transport entities on-path, such as the routers 616, may inspect each data packet for an MTNC-ID, and grant resources or service levels in the transport network according to the MTNC-ID carried in each data packet. Similar configuration may also be made to a gNB 620 (through the N2 interface) for upstream packets over N3 interface. That is, the MTNC-ID may be configured for the gNB 620, which may add the MTNC-ID to each uplink data packet, as will be further described below.

An MTNC-ID is generated by a TPM 602 to be unique for each connection path and per class of service (including QoS requirements and slice). There may be more than one MTNC-ID for the same QoS requirements and connection path if there is a need to provide isolation (slice) of the traffic. MTNC-IDs are per class of service and connection path, and not per user session (nor is it per data path entity).

Since MTNC-IDs are unique, TPMs 602 and 612 at sites that correspond to both ends (service end points) of a connection path may negotiate values of the MTNC-IDs assigned. The MTNC-ID space may be partitioned in the mobile domain so as to avoid collisions. The consumed identifier space may be sparse, if, e.g., the MTNC-IDs are 16 bits or more. Thus, a simple partitioning scheme may be feasible. A formula for determining the number of permutations for "T" traffic classes (i.e., CoS) across "N" sites, with fully meshed, may be (N*(N−1)/2)*T. If there are multiple slices for the same QoS class that needs to be fully isolated, this will increase the number of MTNC-IDs assigned. For example, if there are 5 traffic classes between 16 sites, there are 600 MTNC-IDs that need to be set up and managed.

A TPM 602 creates unique MTNC-IDs per connection path (or forwarding path) and per set of resource provisioning requirements. For example, a TPM 602 at a site may create unique MTNC-IDs per QoS class, path and slice (for an E2E path, i.e., a connection path, between 2 sites with TPMs). If two TPMs 602 and 612 create MTNC-IDs for the same path and attempt to negotiate, the tie may be broken by selecting the one with a greater value (or by any method to resolve). This may be a part of determining the traffic matrix process between the TPMs 602, 612. The TPM 602 may then set up and provision QoS and slice with each SDN-C 614 on the E2E path. With the MTNC-IDs configured or created, the TPM 602 is ready to provision the MTNC-IDs to SMFs 618. Each SMF 618 that has subscribed to paths between sets of UPFs 622 are notified of the corresponding MTNC-IDs and their status. The TPM 602 may send different sets of MTNC-IDs to different SMFs 618 to manage load, lifetime, etc., of MTNC-IDs in a fine-grained manner.

An SDN-C 614 of a transport network may obtain MTNC-IDs from a TPM 602 for setting up per path QoS in the transport network. It may provision routers 616 that it manages with the MTNC-IDs obtained and respond to the TPM 602. The SDN-C 614 may associate transport paths configured with the MTNC-IDs that it has received. There may also be a feedback mechanism between the SDN-C 614 and the TPM 602, where the SDN-C 614 constantly feeds back information about transport paths in the transport network configured according to the MTNC-IDs. The feedback information may include status of the transport paths, load, and other conditions or performance metrics of the transport paths per MTNC-ID.

Each SMF 618 of a customer network may send a subscription request to a TPM 602 of the customer network subscribing a list of MTNC-IDs for a set of UPFs 622 that it manages. A SMF 618 may send, along with the request, the set of UPFs 622 and additional information such as expected traffic (which may be derived based on historical patterns or an operator policy). The TPM 602 may acknowledge the request and notify the SMF 618 with a list of MTNC-IDs per connection path (e.g., UPF-UPF) and class of service (including QoS, slice). A SMF 618 may configure an MTNC-ID with a UPF 622 in the N4 session setup procedure that is specified in the 3GPP TS 23.602. For example, a SMF 618 may add the MTNC-ID in the parameters that are to be provided to the UPF 622 in the N4 session setup procedure according to the 3GPP TS 23.602, and send the all the parameters including the MTNC-ID to the UPF 622.

In the data plane, a gNB 620 or a UPF 622 may insert the MTNC-ID in each packet to be transmitted on a connection path (e.g., N3, or N9 segment). Routers 616 on a connection path may provide services based on the MTNC-ID carried in each data packet and as configured by respective SDN-Cs 614.

Figure 7:
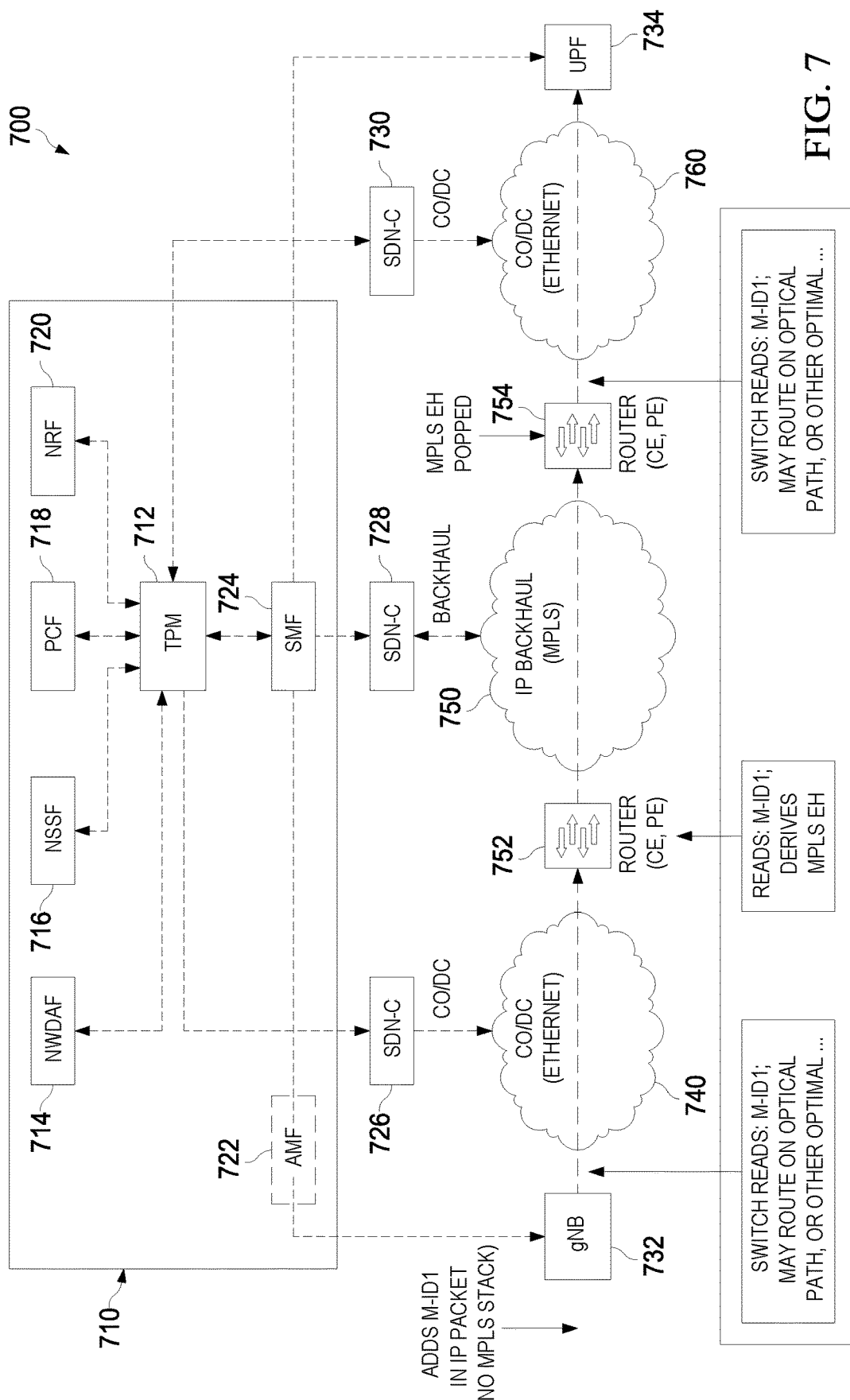
FIG. 7 is a diagram of a communications system highlighting an MTNC-ID configured across multiple transport networks in accordance with an embodiment of the present disclosure.

FIG. 7 is a diagram illustrating an embodiment of a communications system 700 highlighting the configuration of MTNC-IDs across multiple transport networks. The communications system 700 includes a customer network 710. The customer network 710 includes control plane functions such as a TPM 712, a NWDAF 714, a NSSF 716, a PCF 718, a NRF 720, and an AMF 722. As discussed, the TPM 712 may collect data from one or more control plane functions for estimation of traffic demand, CoS, QoS requirements, and traffic matrices. The TPM 712 may provide a list of MTNC-IDs to a SMF 724 for paths between UPFs (N9 interface) or between gNB and UPF (N3 interface), where each of the paths satisfies a provisioned set of QoS, CoS, and isolation requirements. The TPM 712 also provisions MTNC-IDs to one or more SDN-Cs of transport networks, such as SDN-Cs 726, 728, and 730, on a connection path, according to which resources are provisioned to route traffic on the connection path. Multiple MTNC-IDs may be served by the same segment routes in a transport network. The transport network is responsible to provide services that are bound by the MTNC-IDs within the transport network.

A PDN connection may be initiated by a UE. The PDN connection, as shown in this example, includes two (may be more) transport slice segments, i.e., between the gNB 732 and a PE router 752, between PE routers 752 and 754, and between a PE Router 754 and the UPF 734. Based on the CoS, the QoS requirement, and the isolation requirement of the PDN connection, an MTNC-ID may be determined for the connection path between the gNB 732 and the UPF 734. As discussed above, an MTNC-ID may also be determined for a slice segment between two UPFs, or between a UPF and an application server (if the TPM and MTNC-ID mechanism is configured by the 3GPP service provider and the application server provider).

In this example, the connection path between the gNB 732 and the UPF 734 traverses three transport networks, i.e., a CO or DC 740 (which is an Ethernet), a IP backhaul 750, and a CO or DC 760 (which is also an Ethernet). Thus, the same MTNC-ID, i.e., "M-ID1" in this example, corresponding to the connection path between the gNB 732 and the UPF 734 may be provided to each of the SDN-Cs 726-730. Each of the SDN-Cs 726, 728 and 730 manages traffic routing for the PDN connection within the respective transport networks 740, 750, and 760 according to the "M-ID1". The "M-ID1" is thus used across multiple transport networks 740, 750, and 760 on-path between the gNB 732 and the UPF 734.

In the control plane, the PDN connection setup is initiated by the UE, the SMF 724 provides the "M-ID1" to the gNB 732, and the SMF 724 provides the "M-ID1" to the UPF 734. In the data plane, after receiving a data packet from a UE, the gNB 732 may add the "M-ID1" to the data packet received by the gNB 732 and forward the data packet to routers 752, 754 in the CO or DC 740. Data packets may carry metadata or the transport context indicating how the data packets may be routed by routers. Currently, there are two approaches for carrying routing information, i.e., an explicit route list approach and an implicit route approach. In the explicit route list approach, metadata carried in data packets includes explicit route lists for each class of service. Explicit route lists may be used in cases where the control plane for routers may not be able to program the MTNC-IDs. Thus, the explicit route list approach may be used when it is necessary to limit changes to router control plane programming. In the implicit route approach, metadata carried in data packets may only include an MTNC-ID which is associated with a traffic class. The first router (or a subset of routers), e.g., an edge router, in each transport domain may inspect the MTNC-ID carried in each data packet and derive an explicit route list. Implicit routes may be used when there is multiple transport technologies (e.g., optical, multiprotocol label switching (MPLS), and Ethernet) used across a 3GPP transport segment, e.g., the N9 segment as shown in FIG. 4. The multiple transport technologies may include multiprotocol label switching (MPLS), segment routing (SR), SR over IP version 6 (IPv6) data plane (SRV6), layer 1 (optical transport network (OTN)), or layer o (wavelength division multiplexing (WDM)) optical data planes.

Disclosed herein are various embodiments directed to transporting an MTNC-ID over a SRV6 enabled data plane for 5G transport. The present disclosure describes how an incoming packet with MTNC-ID (either it is encapsulated within UDP header or in NSH) that is received from a neighboring domain is transported over a SRV6 network to the next domain. For instance, the disclosed embodiments are applicable if any of N3, N9, or N6 is a SRV6-enabled network. SRV6 data plane transport of the MTNC-ID enables E2E network slicing.

Figure 8:
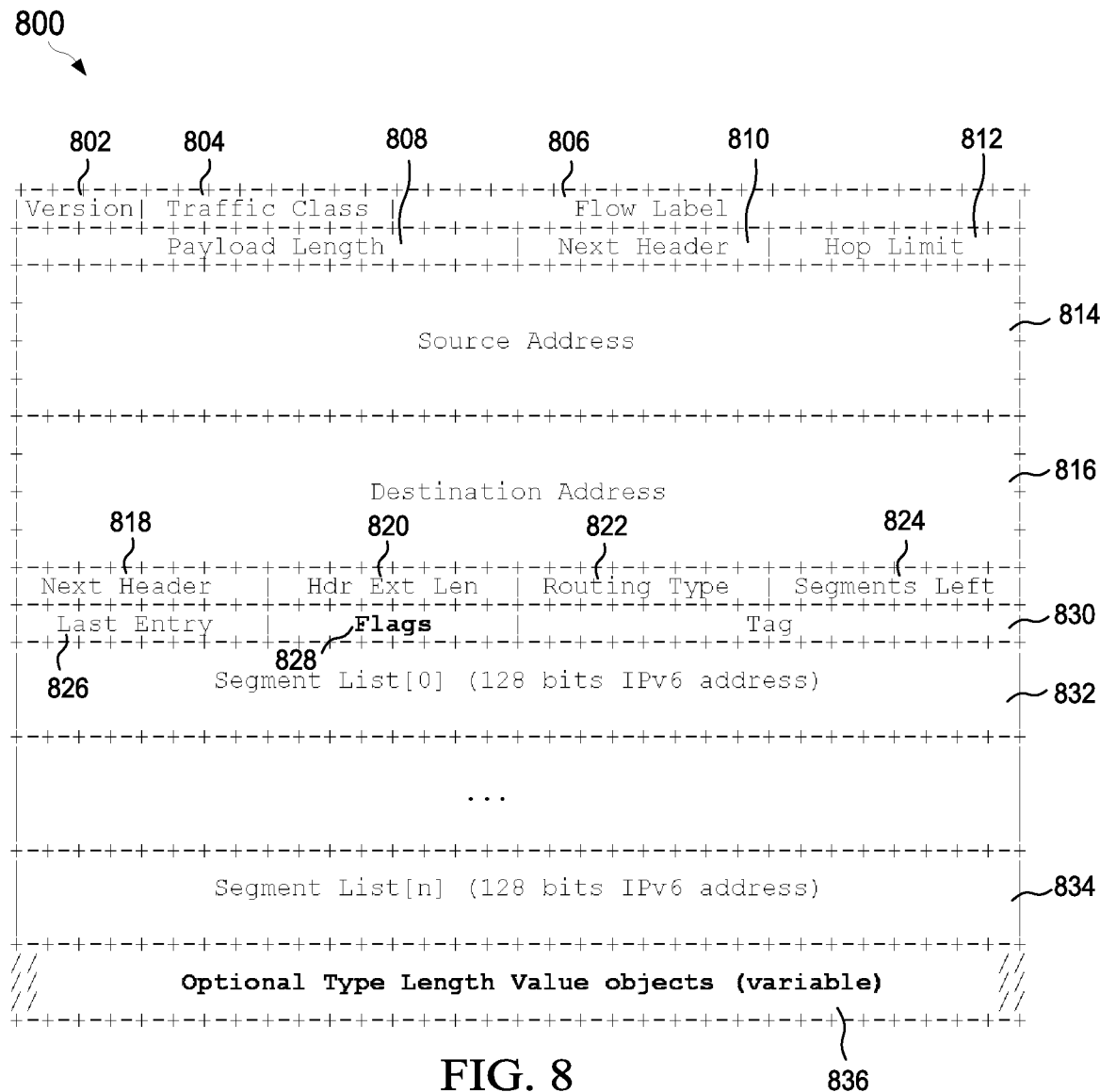
FIG. 8 is a diagram of a segment routing header (SRH) in accordance with an embodiment of the present disclosure.

FIG. 8 is a diagram of a segment routing header (SRH) 800 in accordance with an embodiment of the present disclosure. The SRH 800 can be used to enable Segment Routing (SR) for an IPv6 data plane. SR provides a mechanism that allows a flow to be restricted to a specific topological path, while maintaining per-flow state only at the ingress node(s) to the SR domain. A node steers a packet through an ordered list of instructions, called "segments."

The SRH 800 includes an IPV6 header comprising a version field 802, a traffic class field 804, a flow label field 806, a payload length field 808, a next header field 810, a hop limit field 812, a source address field 814, and a destination address field 816. The version field 802 is a 4-bit field that identifies the Internet Protocol (IP) version number (e.g., 6). The traffic class field 804 is an 8-bit field that is used by the network for traffic management (e.g., used by the originating node and the routers to identify the data packets that belong to the same traffic class and distinguish between packets with different priorities). The flow label field 806 is a 20-bit field that is used by a source to label sequences of packets to be treated in the network as a single flow. The payload length field 808 is a 16-bit unsigned integer field that indicates the length of the payload, i.e., the rest of the packet following the SRH 800, in octets. The next header field 810 is an 8-bit field that identifies the type of header immediately following the IPv6 header, which as described below is a routing extension header. The hop limit field 812 is an 8-bit unsigned integer field that specifies a limit on the number of hops a packet is allowed before being discarded (e.g., to discard packets that are stuck in an indefinite loop due to any routing information errors). The hop limit field 812 is decremented by one, by each node (typically a router) that forwards a packet. The source address field 814 is 128-bits and contains the IPv6 address of the originating node of the packet. The destination address field 816 is 128-bits and contains the destination address of the recipient node of the IPv6 packet. Additional details on the IPV6 header can be found in Request for Comments (RFC) 8200.

As stated above, following the IPV6 header, the SRH 800 includes a routing extension header (also commonly referred to as a routing header, segment routing header, or segment routing extension header). The routing extension header is used by an IPv6 source to list one or more intermediate nodes to be traversed on the way to a packet's destination. The routing extension header includes a next header field 818, a header extension length (Hdr Ext Len) field 820, a routing type field 822, a segments left field 824, a last entry field 826, a flags field 828, a tag field 830, a segment list comprising Segment List[0] field 832 to Segment List[n] field 834, and an optional type-length-value (TLV) objects field 836. The next header field 818, similar to the next header field 810, is an 8-bit field that identifies the type of header immediately following the routing extension header (e.g., other extension headers, transport layer protocol header, etc.). The header extension length field 820 is an 8-bit unsigned integer field that specifies the length of the routing extension header in 8-octet units, not including the first 8 octets. The routing type field 822 is an 8-bit identifier that identifies a particular routing header variant (i.e., identifies this structure as a segment routing extension header). Currently, the routing type field 822 is set as TBD (to be decided by the Internet Assigned Numbers Authority (IANA), suggested value is 4). The segments left field 824 is an 8-bit unsigned integer field that indicates the number of route segments remaining, i.e., number of explicitly listed intermediate nodes still to be visited before reaching the final destination. The last entry field 826 contains the index (zero based), in the segment list, of the last element of the segment list. The flags field 828 is an 8 bit field that is used to identify SRH Flags (e.g., cleanup and fast reroute). The tag field 830 is used to tag a packet as part of a class or group of packets, e.g., packets sharing the same set of properties.

The Segment List[0] field 832 to Segment List[n] field 834 contains an ordered list of segments. A segment is encoded as an IPv6 address. The segment list is encoded starting from the last segment in the Segment List[0] field 832. The Segment List[n] field 834 contains the nth segment in the segment list. A segment can represent any instruction, topological or service based. For instance, a segment can be an instruction a node executes on the incoming packet (e.g., forward packet according to shortest path to destination, or, forward packet through a specific interface, or, deliver the packet to a given application/service instance). The active segment is indicated by the destination address (DA) of the packet. The next active segment is indicated by a pointer in the new routing header.

The optional TLV objects field 836 contains optional TLVs of the SRH 800. A TLV provides meta-data for segment processing. TLVs are present when the header extension length, as indicated in (Hdr Ext Len) field 820, exceeds the last entry element in the segment list.

Figure 9:
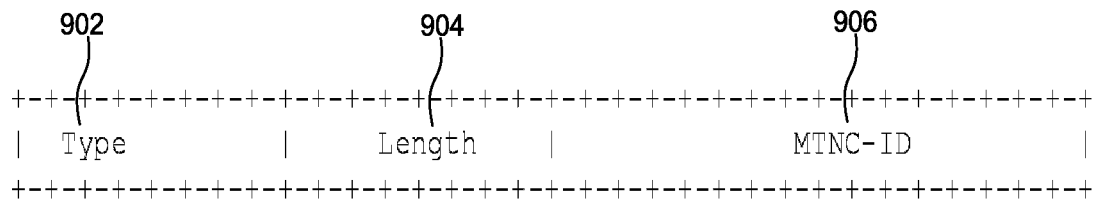
FIG. 9 is a diagram of an MTNC-ID type-length-value (TLV) in accordance with an embodiment of the present disclosure.

FIG. 9 is a diagram of an MTNC-ID TLV 900 in accordance with an embodiment of the present disclosure. The MTNC-ID TLV 900 is a new TLV object that is placed in the optional TLV objects field 836 of the SRH 800 for transporting an MTNC-ID over a SRV6 enabled network for 5G transport. In an embodiment, a new bit (e.g., an M bit) is defined for the flags field 828 of the SRH 800 to indicate the MTNC-ID TLV 900 is included in the optional TLV objects field 836 of the SRH 800.

In an embodiment, the MTNC-ID TLV 900 is 32 bits comprising a type field 902, a length field 904, and an MTNC-ID field 906. The type field 902 is an 8 bit value (TBD) that identifies the TLV object as an MTNC-ID TLV type. Type defines both the format and the semantic of the information carried in the MTNC-ID TLV 900. The length field 904 is 2 octets and specifies the length of the MTNC-ID TLV 900, not including the type field 902 and length field 904. The length field 904 of the TLV is used to skip the MTNC-ID TLV 900 while inspecting the SRH 800 in case the node doesn't support or recognize the type. The MTNC-ID field 906 is 2 octets and contains the MTNC-ID.

As will be further described, in an embodiment, when the last segment in the Segment List[0] field 832 is processed at an egress ASBR of the SRV6 enabled network, the egress ASBR checks the MTNC-ID TLV 900 and extracts the MTNC-ID 906 associated with the segment list. The egress ASBR inserts the MTNC-ID into a data plane header of the data packet (e.g., prefixes MTNC-ID in NSH, or encapsulates MTNC-ID within UDP header), and transmits the data packet with the MTNC-ID in the data plane header of the data packet to an ASBR of a next domain based on a forwarding path corresponding to the MTNC-ID.

Figure 10:
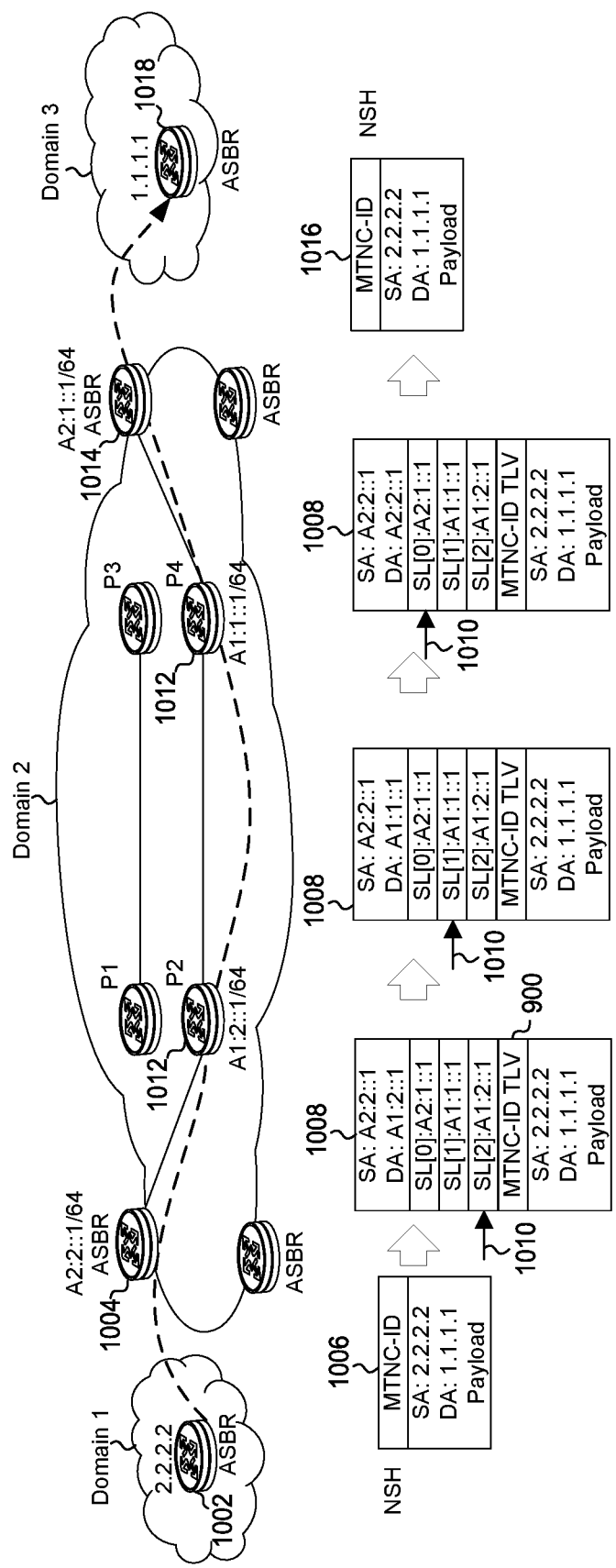
FIG. 10 is a diagram of a communications system illustrating an MTNC-ID being transported over a Segment Routing Version 6 (SRV6) enabled data plane for 5G transport when MTNC-ID is in a Network Service Header (NSH) in accordance with an embodiment of the present disclosure.

As an example, FIG. 10 is a diagram of a communications system illustrating an MTNC-ID being transported over a SRV6 enabled data plane for 5G transport and forwarding the MTNC-ID in a NSH in accordance with an embodiment of the present disclosure. In the depicted embodiment, Domain 2 is a SRV6 enabled network. An ingress ASBR provider edge (PE) 1004 in Domain 2 receives, from egress ASBR 1002 in Domain 1, a data packet 1006 containing an MTNC-ID as part of a NSH of the data packet 1006. The ingress ASBR PE 1004 in Domain 2 has a routing table, which was pre-provisioned by the software-defined network (SDN) controller in the negotiation process as described above, that points the MTNC-ID to the segment list for the data packets. The ingress ASBR PE 1004 encapsulates the MTNC-ID in an MTNC-ID TLV 900 at the bottom of the segment list of the SRH 800 in data packet 1008. The data packet 1008 is forwarded to a next hop within the Domain 2 (indicated by pointer→1010) according to the segment list. The intermediate routers/nodes 1012 within the Domain 2 do not process the MTNC-ID TLV 900. The intermediate routers/nodes 1012 within the Domain 2 simply forward the data packet 1008 to a next hop within the Domain 2 according to the segment list. When the last segment in the Segment List[0] field is processed at an egress ASBR PE 1014 of Domain 2, the egress ASBR PE 1014 extracts the MTNC-ID from the MTNC-ID TLV 900 in the data packet 1008. The egress ASBR PE 1014 then prefixes the MTNC-ID in a NSH of data packet 1016, and forwards the data packet 1016 to ASBR 1018 in Domain 3 completing the transport of the MTNC-ID over the SRV6 enabled data plane/network for 5G transport.

Figure 11:
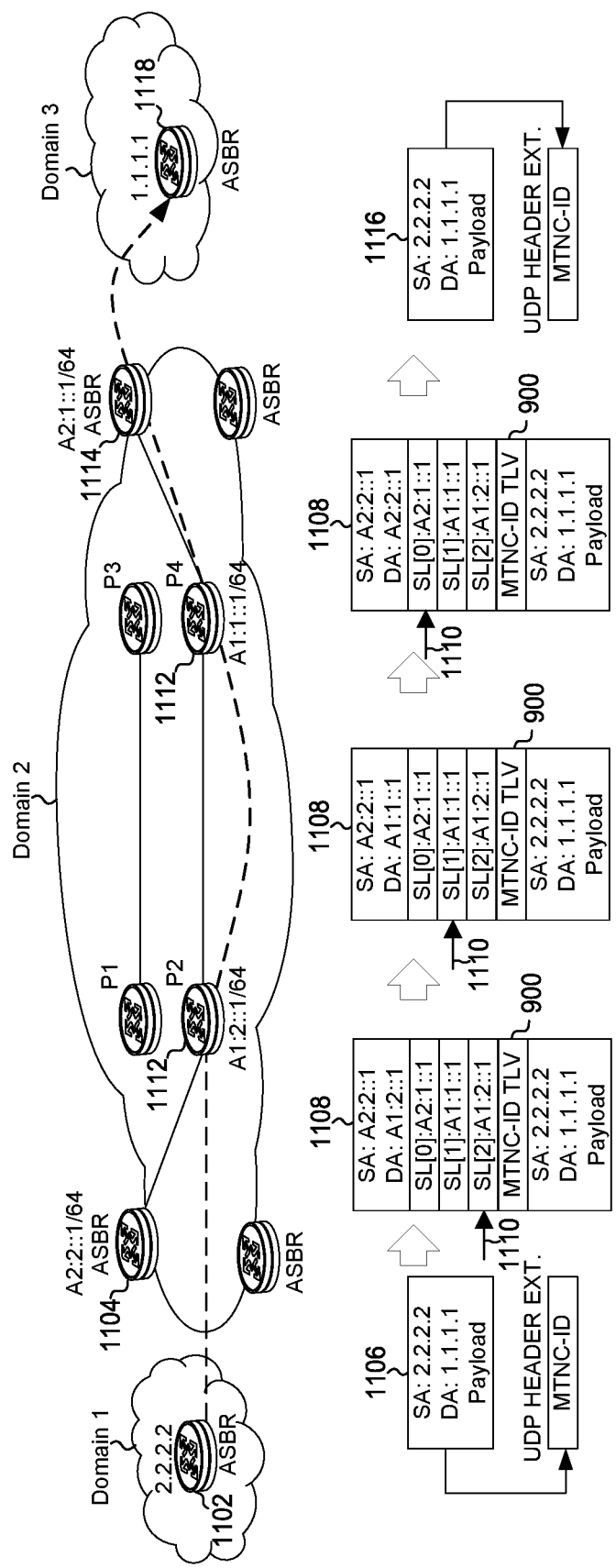
FIG. 11 is a diagram of a communications system illustrating an MTNC-ID being transported over a SRV6 enabled data plane for 5G transport when MTNC-ID is in a part of a User Datagram Protocol (UDP) header in accordance with an embodiment of the present disclosure.

Similarly, FIG. 11 is a diagram of a communications system illustrating an MTNC-ID being transported over a SRV6 enabled data plane for 5G transport when MTNC-ID is in a part of a UDP header in accordance with an embodiment of the present disclosure. In the depicted embodiment, Domain 2 is a SRV6 enabled network. The ingress ASBR provider edge (PE) 1104 in Domain 2 receives, from egress ASBR 1102 in Domain 1, a data packet 1106 containing an MTNC-ID encapsulated in an extension of the UDP header of the data packet 1106 from egress ASBR 1102 Domain 1. The ingress ASBR PE 1104 in Domain 2 has a routing table, which was pre-provisioned by the SDN controller in the negotiation process as described above, that points the MTNC-ID to the segment list for the data packets. The ingress ASBR PE 1104 encapsulates the MTNC-ID in the MTNC-ID TLV 900 at the bottom of the segment list of the SRH 800 in data packet 1108. In an embodiment, the ingress ASBR PE 1104 also sets the M bit or other defined flag in the flag field 828 of the SRH 800 to signify that the data packet 1108 is to indicate the MTNC-ID TLV (e.g., MTNC-ID TLV 900) is included in the optional TLV objects field 836 of the SRH 800.

The data packet 1108 is forwarded to a next hop within the Domain 2 (indicated by pointer→1110) according to the segment list. The intermediate routers/nodes 1112 within the Domain 2 do not process the MTNC-ID TLV 900. The intermediate routers/nodes 1112 within the Domain 2 simply forward the data packet 1108 to a next hop within the Domain 2 according to the segment list. When the last segment in the Segment List[0] field is processed at an egress ASBR PE 1114 of Domain 2, the egress ASBR PE 1114 extracts the MTNC-ID from the MTNC-ID TLV 900 in the data packet 1108. The egress ASBR PE 1114 then encapsulates the MTNC-ID in an extension of the UDP header of the data packet 1116, and forwards the data packet 1116 to ASBR 1118 in Domain 3 completing the transport of the MTNC-ID over the SRV6 enabled data plane/network for 5G transport.

Figure 12:
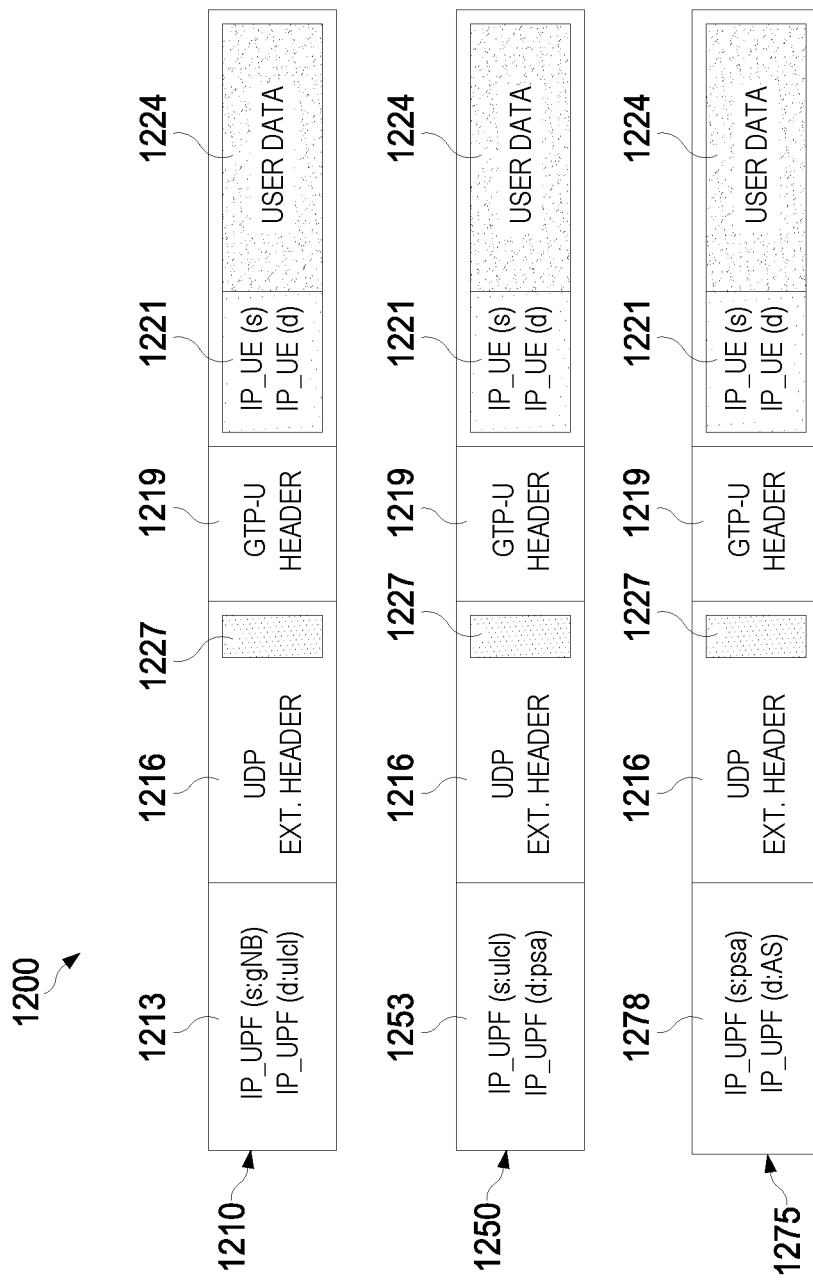
FIG. 12 is a diagram illustrating an encapsulation of a data packet across a communications system in accordance with an embodiment of the present disclosure.

FIG. 12 is a diagram 1200 illustrating an encapsulation of a data packet across a communications system, such as the communications system 700 of FIG. 7, according to various embodiments of the disclosure. In particular, diagram 1200 shows encapsulated data packets 1210, 1250, and 1275.

The encapsulated data packet 1210 represents the data packet after encapsulation is performed by the gNB, such as the gNB 732 of the communications network. For example, when the gNB receives a data packet from an UE comprising user data 1224, the gNB encapsulates the data packet to include an inner IP header 1221, a GTP-user data tunnel (GTP-U) header 1219, the UDP extension header 1216, and an outer IP header 1213. In this way, at the gNB, the encapsulated data packet 1210 includes the outer IP header 1213, the UDP extension header 1216, the GTP-U header 1219, the inner IP header 1221, and the user data 1224.

The outer IP header 1213 may be an IPv6 header or an IPv4 header signaling the source and the destination for a first communication path (e.g., N3 segment) between the gNB and the first UPF on the forwarding path. For example, referring back to the communications system 500 of FIG. 5, the outer IP header 1213 may indicate that the source is the gNB 518 and that the destination is the UPF 520.

In an embodiment, the UDP extension header 1216 includes a standard UDP header as defined in RFC 768. In accordance with an embodiment, the UDP extension header 1216 extends the standard UDP header to include a field that carries the MTNC-ID 1227 associated with the forwarding path along which to forward the encapsulated data packet 1210.

The GTP-U header 1219 may be similar to the standard GTP-U header, as further described in the 3GPP TS 23.502 document. For example, the GTP-U header 1219 may include tunnel endpoint identifiers indicating endpoints of the communication path.

The inner IP header 1221 may be an IPv6 header or an IPv4 header signaling the end source and the end destination of the encapsulated data packet 1210. For example, the inner IP header 1221 may indicate the source as an address of the UE from which the user data 1224 originated, and the destination as an address of the destination toward which the encapsulated data packet 1210 is destined. The user data 1224 may be the payload of the encapsulated data packet 1210, including the user data received from the UE or source.

Referring now to the encapsulated data packet 1250, the encapsulated data packet 1250 represents the data packet being transported through the N9 segment. For example, referring back to the communications system 500 of FIG. 5, after the UPF 520 receives the encapsulated data packet 1210, and the UPF 520 decapsulates the encapsulated data packet 1210 by removing the outer IP header 1213 from the encapsulated data packet 1210. The UPF 520 adds a new outer IP header 1253 to the encapsulated data packet 1210 to create the encapsulated data packet 1250. The new outer IP header 1253 indicates the source and the destination for the next communication path (e.g., N9 segment) along the forwarding path to the destination. In this case, still referring to the communications system 500 of FIG. 5, the outer IP header 1253 may indicate that the source is the UPF 520 and that the destination is the UPF 534. Similar to the encapsulated data packet 1210, the encapsulated data packet 1250 includes the same UDP extension header 1216 (carrying the MTNC-ID 1227), GTP-U header 1219, inner IP header 1221, and user data 1224.

The encapsulated data packet 1275 represents the data packet being transported through the N6 segment. For example, referring back to the communications system 500 of FIG. 5, after the UPF 534 receives the encapsulated data packet 1250, and the UPF 534 decapsulates the encapsulated data packet 1250 by removing the outer IP header 1253 from the encapsulated data packet 1250. The UPF 534 adds a new outer IP header 1278 to the encapsulated data packet 1250 to create the encapsulated data packet 1275. The new outer IP header 1278 indicates the source and the destination for the next communication path (e.g., N6 segment) along the forwarding path to the destination. In this case, still referring to the communications system 500 of FIG. 5, the outer IP header 1278 may indicate that the source is the UPF 534 and that the destination is the AS 536. Similar to the encapsulated data packets 1210 and 1250, the encapsulated data packet 1275 includes the same UDP extension header 1216 (carrying the MTNC-ID 1227), GTP-U header 1219, inner IP header 1221, and user data 1224.

As shown by FIG. 12, as a data packet passes through multiple domains (e.g., transport networks) of a communications system, only the outer IP headers 1213, 1253, and 1278, which indicate the source and destination of the communications paths (e.g., N3, N6, and N9 segments) along which the data packet is forwarded, change. The UDP extension header 1216, GTP-U header 1219, inner IP header 1221, and user data 1224 remain the same in the data packet as the data packet passes through multiple domains of a communications system. In this way, the MTNC-ID 1227 is carried in the UDP extension header 1216 of the data packet as the data packet passes through multiple domains of a communications system, regardless of the transport technology implemented by each domain.

However, as shown above in FIG. 11, in accordance with the disclosed embodiments, if the data packet passes through a SRV6 enabled network, the MTNC-ID 1227 can be extracted from the UDP extension header 1216, and encapsulated into an MTNC-ID TLV 900 and carried in a SRH 800 of a data packet, and then extracted and inserted back into the UDP extension header 1216 of a data packet once it passes through the SRV6 enabled network. A similar process can be performed if the MTNC-ID 1227 is carried in the NSH of a data packet. In various alternative embodiments, the method can also receive the MTNC-ID in the NSH of a data packet, extract and carry the MTNC-ID over the SRV6 enabled network, and encapsulate the MTNC-ID into a UDP extension header of a data packet once it passes through the SRV6 enabled network. Similarly, the method can receive the MTNC-ID in a UDP extension header of a data packet, extract and carry the MTNC-ID over the SRV6 enabled network, and prefix the MTNC-ID in the NSH of a data packet once it passes through the SRV6 enabled network.

Figure 13:
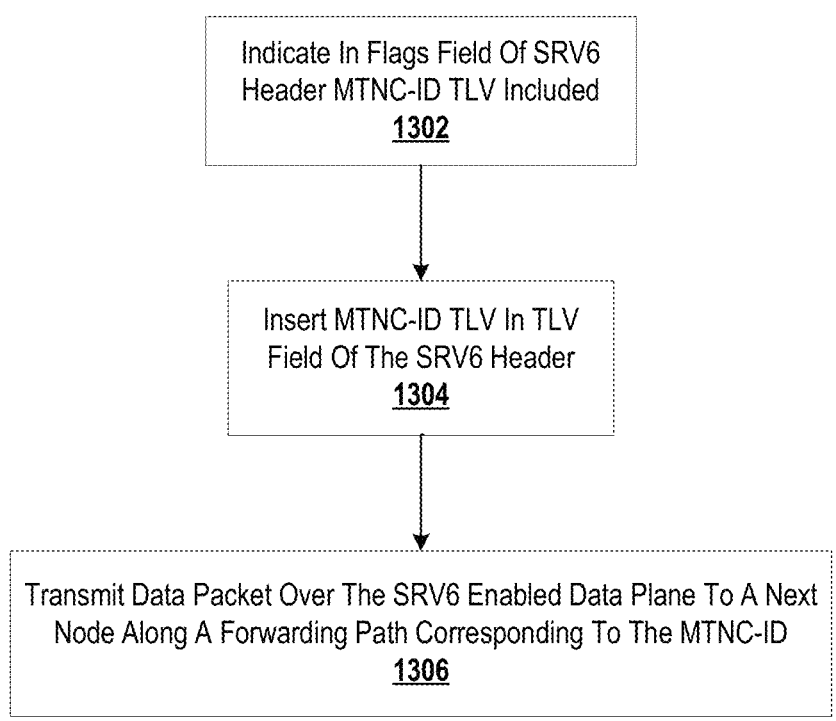
FIG. 13 is a flowchart illustrating a method performed by a Next Generation Node B (gNB) for transporting an MTNC-ID over a SRV6 enabled data plane for 5G transport in accordance with an embodiment of the present disclosure.

FIG. 13 is a flowchart illustrating a method performed by a gNB, such as gNB 518, for transporting an MTNC-ID over a SRV6 enabled data plane for 5G transport in accordance with an embodiment of the present disclosure. In an embodiment, to transport an MTNC-ID over a SRV6 enabled data plane, the method at step 1302 sets an indicator in a flags field (e.g., flags field 828) of a SRV6 header (e.g., SRH 800) of a data packet to indicate that an MTNC-ID type-length-value (TLV) (e.g., MTNC-ID TLV 900) is included in an optional TLV field (e.g., TLV objects field 836) of the SRV6 header. The method at step 1304 inserts the MTNC-ID TLV containing the MTNC-ID in the optional TLV field of the SRV6 header of the data packet. As described above, the MTNC-ID is associated with a set of resource provisioning requirements for one or more transport networks on the forwarding path to provision transport resources for forwarding traffic on the forwarding path. In an embodiment, the set of resource provisioning requirements comprises a combination of QoS requirements, CoS requirements, a resilience requirement, and an isolation requirement, according to which transport resources of a transport network are provisioned for routing traffic between two service end points. In an embodiment, the MTNC-IDs for each domain and for each traffic class are established by a domain orchestrator (DO). The method at step 1306 transmits the data packet over the SRV6 enabled data plane to a next node along a forwarding path corresponding to the MTNC-ID.

Figure 14:
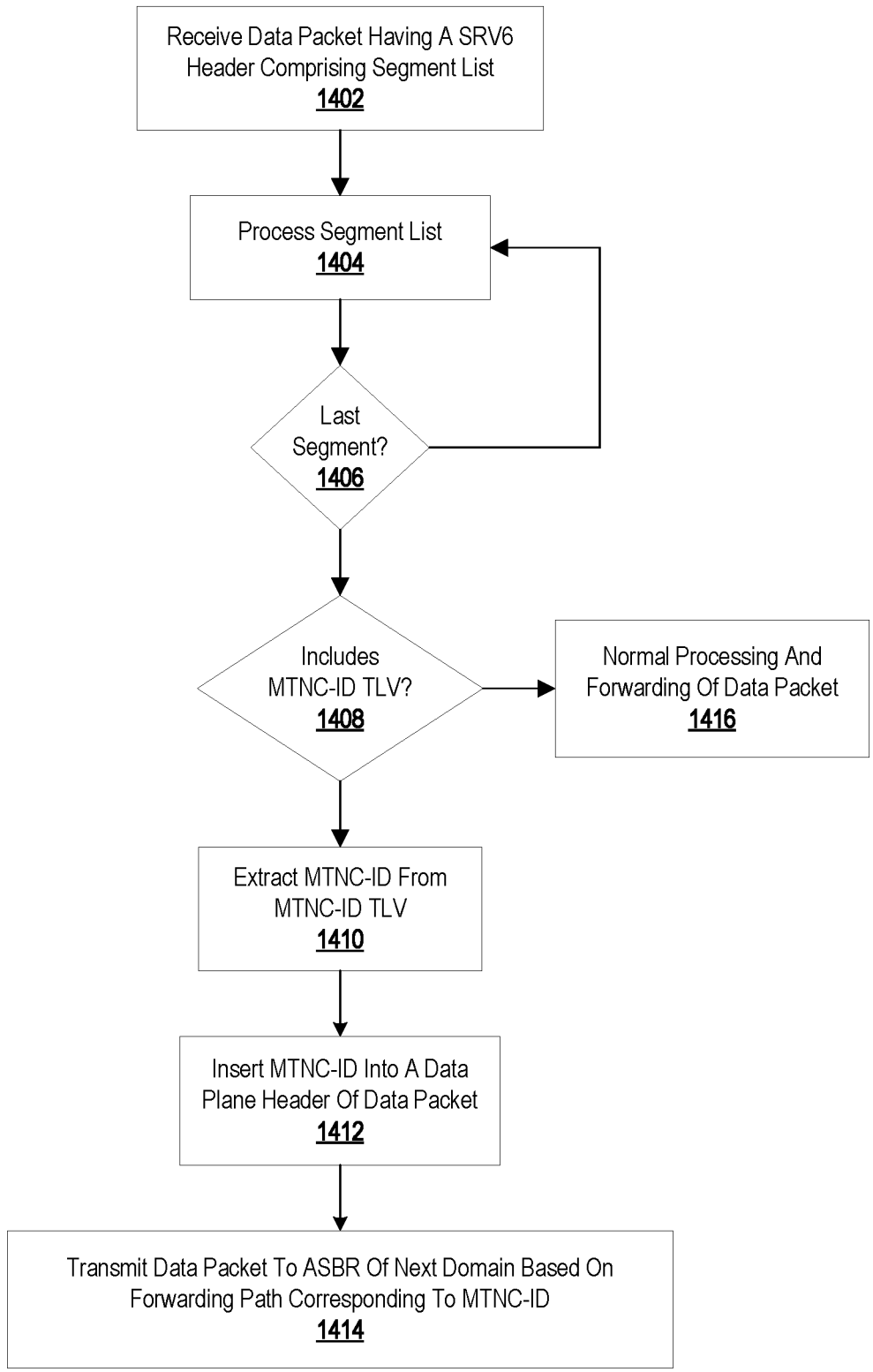
FIG. 14 is a flowchart illustrating a method performed by an egress Autonomous System Boundary Router (ASBR) for transporting an MTNC-ID over a SRV6 enabled data plane for 5G transport in accordance with an embodiment of the present disclosure.

FIG. 14 is a flowchart illustrating a method performed by an egress ASBR, such as ASBR 1014, for transporting an MTNC-ID over a SRV6 enabled data plane for 5G transport in accordance with an embodiment of the present disclosure. The method at step 1402 receives a data packet having a SRV6 header (e.g., SRH 800) comprising a segment list (e.g., a segment list comprising Segment List[0] field 832 to Segment List[n] field 834). At step 1404, the method processes the segment list in the SRV6 header. After processing a last segment of the segment list at step 1406, the method at step 1408 determines whether a TLV field (e.g., TLV objects field 836) of the SRV6 header of the data packet includes an MTNC-ID TLV (e.g., MTNC-ID TLV 900) associated with the segment list. In an embodiment, the method can check the flags field 828 for the M bit (or other defined flag) that indicate that the data packet includes an MTNC-ID TLV.

If the TLV field of the SRV6 header of the data packet does not include an MTNC-ID TLV associated with the segment list, the method at step 1416 performs normal processing and forwarding of the data packet. If the TLV field of the SRV6 header of the data packet includes an MTNC-ID TLV associated with the segment list, the method at step 1410 extracts an MTNC-ID from the MTNC-ID TLV associated with the segment list. The method at step 1412 inserts the MTNC-ID into a data plane header of the data packet. For example, the method can prefix the MTNC-ID as part of the NSH of the data packet, or the method can encapsulate the MTNC-ID in the UDP header of the data packet. The method at step 1414 transmits the data packet with the MTNC-ID in the data plane header of the data packet to an ASBR of a next domain based on a forwarding path corresponding to the MTNC-ID. As described above, a SDN controller can create the forwarding path and bind the MTNC-ID to the forwarding path. The MTNC-ID is associated with a set of resource provisioning requirements for one or more transport networks on the forwarding path to provision transport resources for forwarding traffic on the forwarding path.

Figure 15:
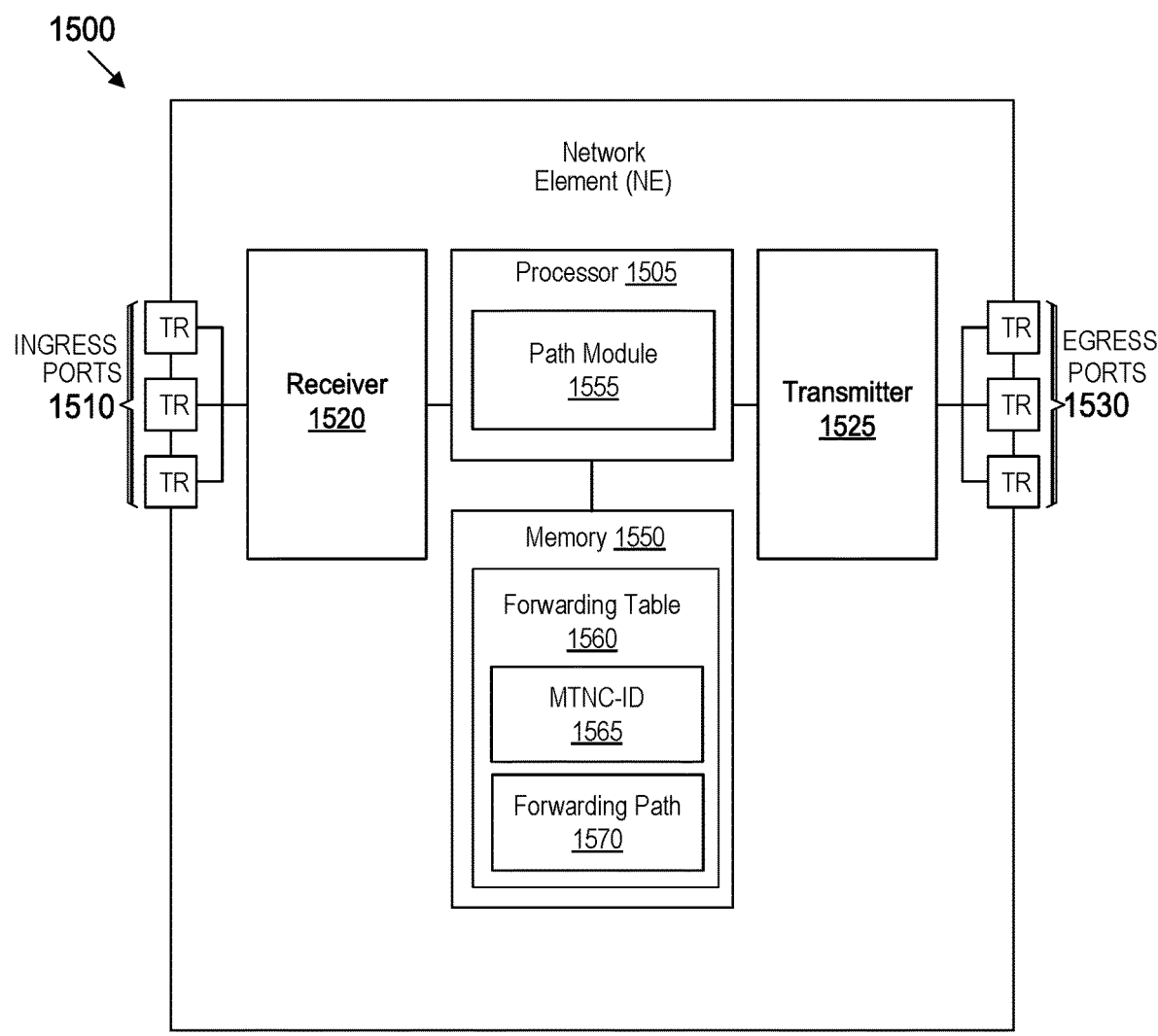
FIG. 15 is a schematic diagram of a system, apparatus, or network element/node in accordance with an embodiment of the present disclosure.

FIG. 15 is a diagram of an embodiment of a network element (NE) 1500 in the network 100. For instance, the NE 1500 may be similar to the routers 554, 556, 558, 564, 566, and 568, UPFs 520 and 534, and the AS 536 in the communications system 500 of FIG. 5. The NE 1500 may be configured as a gNB or an ASBR to implement and/or support the methods of transporting MTNC-IDs over a SRV6 enabled data plane for 5G transport as described herein. The NE 1500 may be implemented in a single node or the functionality of NE 1500 may be implemented in a plurality of nodes. One skilled in the art will recognize that the term NE encompasses a broad range of devices of which NE 1500 is merely an example. The NE 1500 is included for purposes of clarity of discussion, but is in no way meant to limit the application of the present disclosure to a particular NE embodiment or class of NE embodiments. At least some of the features and/or methods described in the disclosure may be implemented in a network apparatus or module such as an NE 1500. For instance, the features and/or methods in the disclosure may be implemented using hardware, firmware, and/or software installed to run on hardware. As shown in FIG. 15, the NE 1500 comprises one or more ingress ports 1510 and a receiver unit (Rx) 1520 for receiving data, at least one processor, logic unit, or central processing unit (CPU) 1505 to process the data, a transmitter unit (Tx) 1525 and one or more egress ports 1530 for transmitting the data, and a memory 1550 for storing the data.

The processor 1505 may comprise one or more multi-core processors and be coupled to a memory 1550, which may function as data stores, buffers, etc. The processor 1505 may be implemented as a general processor or may be part of one or more application specific integrated circuits (ASICs) and/or digital signal processors (DSPs). The processor 1505 may comprise a path module 1555, which may perform the various methods discussed above. As such, the inclusion of the path module 1555 and associated methods and systems provide improvements to the functionality of the NE 1500. Further, the path module 1555 effects a transformation of a particular article (e.g., the network) to a different state. In an alternative embodiment, path module 1555 may be implemented as instructions stored in the memory 1550, which may be executed by the processor 1505.

The memory 1550 may comprise a cache for temporarily storing content, e.g., a random-access memory (RAM). Additionally, the memory 1550 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof. The memory 1550 may be configured to the forwarding table 1560, which stores mappings between the MTNC-IDs 1565 and the forwarding paths 1570. In this way, the forwarding table 1560 indicates the next hop (e.g., next NE) on a forwarding path 1570 to forward a data packet carrying the MTNC-ID 1565.

It is understood that by programming and/or loading executable instructions onto the NE 1500, at least one of the processor 1505 and/or memory 1550 are changed, transforming the NE 1500 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC in a particular machine or apparatus, likewise a computer that has been programmed and/or loaded with executable instructions may be viewed as a particular machine or apparatus.

Figure 16:
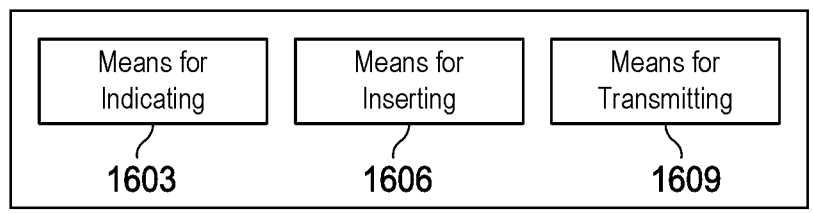
FIG. 16 is a diagram of an apparatus configured to transport MTNC-IDs over a SRV6 enabled data plane for 5G transport in accordance with an embodiment of the present disclosure.

FIG. 16 is a diagram of an apparatus 1600 configured to transport MTNC-IDs over a SRV6 enable data place for 5G transport according to various embodiments of the disclosure. The apparatus 1600 comprises a means for indicating 1603 that a data packet comprises an MTNC-ID corresponding to a forwarding path and being associated with a set of resource provisioning requirements for one or more transport networks on the forwarding path to provision transport resources for forwarding traffic on the forwarding path, a means for inserting 1606 the MTNC-ID into an SRV6 header of the data packet, and a means for transmitting 1609 the data packet to a NE in the communications system based on the forwarding path corresponding to the MTNC-ID.

Figure 17:
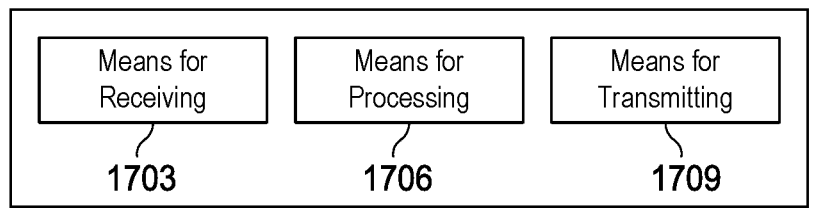
FIG. 17 is a diagram of another apparatus configured to transport MTNC-IDs over a SRV6 enabled data plane for 5G transport in accordance with an embodiment of the present disclosure.

FIG. 17 is a diagram of an apparatus 1700 configured to transport MTNC-IDs across multiple domains according to various embodiments of the disclosure. The apparatus 1700 comprises a means for receiving 1703 a data packet having an SRV6 header comprising a segment list and an MTNC-ID from a previous NE in the communications system, the MTNC-ID corresponding to a forwarding path and being associated with a set of resource provisioning requirements for one or more transport networks on the forwarding path to provision transport resources for forwarding traffic on the forwarding path; a means for processing 1706 the segment list and extracting an MTNC-ID from the MTNC-ID TLV associated with the segment list, and inserting the MTNC-ID into a data plane header of the data packet; and a means for transmitting 1709 the data packet to a next NE on the forwarding path based on the MTNC-ID.

The disclosed embodiments may be a system, an apparatus, a method, and/or a computer program product at any possible technical detail level of integration. The computer program product may include a computer readable storage medium (or media) having computer readable program instructions thereon for causing a processor to carry out aspects of the present disclosure. The computer readable storage medium may be a tangible device that can retain and store instructions for use by an instruction execution device.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method performed by a next generation node B (gNB) for transporting a multi-transport network context identifier (MTNC-ID) over a segment routing version 6 (SRV6) enabled data plane for fifth generation (5G) transport, the method comprising:

setting an indicator in a flags field of a SRV6 header of a data packet that an MTNC-ID type-length-value (TLV) is included in a TLV field of the SRV6 header;

inserting the MTNC-ID TLV for the MTNC-ID in the TLV field of the SRV6 header of the data packet; and transmitting the data packet over the SRV6 enabled data plane to a next node along a forwarding path corresponding to the MTNC-ID, wherein the MTNC-ID is associated with a set of resource provisioning requirements for one or more transport networks on the forwarding path to provision transport resources for forwarding traffic on the forwarding path.

2. The method of claim 1, wherein the MTNC-ID TLV is 32 bits.

3. The method of claim 1, wherein the MTNC-ID TLV comprises an MTNC-ID type field, a length field, and a 2 octets (16 bits) MTNC-ID field.

4. The method of claim 1, wherein the set of resource provisioning requirements comprises a combination of quality of service (QoS) requirements, class of service (CoS) requirements, a resilience requirement, or an isolation requirement, according to which transport resources of a transport network from the one or more transport networks are provisioned for routing the traffic between two service end points.

5. The method of claim 1, wherein the MTNC-ID for each domain and for each traffic class are established by a domain orchestrator (DO).

6. A method performed by an egress autonomous system boundary router (ASBR) for transporting a multi-transport network context identifier (MTNC-ID) over segment routing version 6 (SRV6) enabled data plane for fifth generation (5G) transport, the method comprising:

receiving a data packet having a SRV6 header comprising a segment list;

processing the segment list;

after processing a last segment of the segment list, determining whether a type-length-value (TLV) field of the SRV6 header of the data packet includes an MTNC-ID TLV associated with the segment list;

responsive to a determination that the TLV field of the SRV6 header of the data packet includes the MTNC-ID TLV, extracting an MTNC-ID from the MTNC-ID TLV associated with the segment list;

inserting the MTNC-ID into a data plane header of the data packet; and transmitting the data packet with the MTNC-ID in the data plane header of the data packet to an ASBR of a next domain based on a forwarding path corresponding to the MTNC-ID, wherein the MTNC-ID is associated with a set of resource provisioning requirements for one or more transport networks on the forwarding path to provision transport resources for forwarding traffic on the forwarding path.

7. The method of claim 6, wherein the data plane header is a Network Service Header (NSH), and wherein inserting the MTNC-ID into the data plane header of the data packet comprises prefixing the MTNC-ID as part of the NSH of the data packet.

8. The method of claim 6, wherein the data plane header is a User Datagram Protocol (UDP) header, and wherein inserting the MTNC-ID into the data plane header of the data packet comprises encapsulating the MTNC-ID in the UDP header of the data packet.

9. The method of claim 6, wherein the forwarding path is created by a software-defined network (SDN) controller, and wherein the MTNC-ID is binded to the forwarding path by the SDN controller.

10. The method of claim 6, wherein the set of resource provisioning requirements comprises a combination of quality of service (QoS) requirements, class of service (CoS) requirements, a resilience requirement, or an isolation requirement, according to which transport resources of a transport network from the one or more transport networks are provisioned for routing the traffic between two service end points.

11. A system for transporting a Multi-Transport Network Context Identifier (MTNC-ID) over a Segment Routing Version 6 (SRV6) enabled data plane for fifth generation (5G) transport, the system comprising:
a memory comprising instructions; and
a processor in communication with the memory, the processor executing the instructions to:
set an indicator in a flags field of a SRV6 header of a data packet that an MTNC-ID type-length-value (TLV) is included in a TLV field of the SRV6 header;
insert the MTNC-ID TLV for the MTNC-ID in the TLV field of the SRV6 header of the data packet; and
transmit the data packet over the SRV6 enabled data plane to a next node along a forwarding path corresponding to the MTNC-ID, wherein the MTNC-ID is associated with a set of resource provisioning requirements for one or more transport networks on the forwarding path to provision transport resources for forwarding traffic on the forwarding path.

12. The system of claim 11, wherein the MTNC-ID TLV is 32 bits.

13. The system of claim 11, wherein the MTNC-ID TLV comprises an MTNC-ID type field, a length field, and a 2 octets (16 bits) MTNC-ID field.

14. The system of claim 11, wherein the set of resource provisioning requirements comprises a combination of quality of service (QoS) requirements, class of service (CoS) requirements, a resilience requirement, or an isolation requirement, of which transport resources of a transport network from the one or more transport networks are provisioned for routing the traffic between two service end points.

15. The system of claim 11, wherein the MTNC-ID for each domain and for each traffic class are established by a domain orchestrator (DO).

16. The system of claim 11, wherein the system is a Next Generation Node B (gNB).

17. A system for transporting a Multi-Transport Network Context Identifier (MTNC-ID) over Segment Routing Version 6 (SRV6) enabled data plane for fifth generation (5G) transport, the system comprising:
a memory comprising instructions; and
a processor in communication with the memory, the processor executing the instructions to:
receive a data packet having a SRV6 header comprising a segment list;
process the segment list;
after processing a last segment of the segment list, determining whether a type-length-value (TLV) field of the SRV6 header of the data packet includes an MTNC-ID TLV associated with the segment list;
responsive to a determination that the TLV field of the SRV6 header of the data packet includes the MTNC-ID TLV, extract an MTNC-ID from the MTNC-ID TLV associated with the segment list;
insert the MTNC-ID into a data plane header of the data packet; and
transmit the data packet with the MTNC-ID in the data plane header of the data packet to an autonomous system boundary router (ASBR) of a next domain based on a forwarding path corresponding to the MTNC-ID, wherein the MTNC-ID is associated with a set of resource provisioning requirements for one or more transport networks on the forwarding path to provision transport resources for forwarding traffic on the forwarding path.

18. The system of claim 17, wherein the data plane header is a Network Service Header (NSH), and wherein inserting the MTNC-ID into the data plane header of the data packet comprises prefixing the MTNC-ID as part of the NSH of the data packet.

19. The system of claim 17, wherein the data plane header is a User Datagram Protocol (UDP) header, and wherein inserting the MTNC-ID into the data plane header of the data packet comprises encapsulating the MTNC-ID in the UDP header of the data packet.

20. The system of claim 17, wherein the forwarding path is created by a software-defined network (SDN) controller, and wherein the MTNC-ID is binded to the forwarding path by the SDN controller.

21. The system of claim 17, wherein the set of resource provisioning requirements comprises a combination of quality of service (QoS) requirements, class of service (CoS) requirements, a resilience requirement, or an isolation requirement, of which transport resources of a transport network from the one or more transport networks are provisioned for routing the traffic between two service end points.

22. The system of claim 17, wherein the system is an egress ASBR.

* * * * *